US011838244B2

(12) United States Patent
Pelletier et al.

(10) Patent No.: US 11,838,244 B2
(45) Date of Patent: Dec. 5, 2023

(54) RECEIVER BANDWIDTH ADAPTATION

(71) Applicant: InterDigital Patent Holdings, Inc., Wilmington, DE (US)

(72) Inventors: Benoit Pelletier, Roxboro (CA); Paul Marinier, Brossard (CA); Marian Rudolf, Montreal (CA); J. Patrick Tooher, Montreal (CA); Tao Deng, Roslyn, NY (US); Ghyslain Pelletier, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/674,013

(22) Filed: Feb. 17, 2022

(65) Prior Publication Data
US 2022/0173879 A1 Jun. 2, 2022

Related U.S. Application Data

(63) Continuation of application No. 16/345,762, filed as application No. PCT/US2017/058754 on Oct. 27, 2017, now Pat. No. 11,290,245.
(Continued)

(51) Int. Cl.
*H04L 5/00* (2006.01)
*H04L 1/00* (2006.01)
(Continued)

(52) U.S. Cl.
CPC .......... *H04L 5/0098* (2013.01); *H04L 1/0026* (2013.01); *H04L 1/1657* (2013.01);
(Continued)

(58) Field of Classification Search
CPC ... H04L 5/0098; H04L 1/0026; H04L 1/1657; H04L 1/1671; H04L 5/0055;
(Continued)

(56) References Cited

U.S. PATENT DOCUMENTS 6,385,262 B1   5/2002  Gustafsson et al.
11,290,245 B2 * 3/2022  Pelletier ............... H04L 5/0087
(Continued)

FOREIGN PATENT DOCUMENTS

CN   101536446 A   9/2009
CN   102487371 A   6/2012
(Continued)

OTHER PUBLICATIONS

3rd Generation Partnership Project (3GPP), R1-1610089, "Dl Control Channel Framework for NR", InterDigital Communications, 3GPP TSG-RAN WG1 #86bis, Lisbon, Portugal, Oct. 10-14, 2016, pp. 1-5.
(Continued)

*Primary Examiner* — Michael J Moore, Jr.
(74) *Attorney, Agent, or Firm* — Flaster Greenberg, P.C.

(57) ABSTRACT

A receiver bandwidth adaptation for radio access technologies (RATs) may be for a New Radio (NR) or 5G flexible RAT. A WTRU control channel (e.g., receiver) bandwidth may change, for example, based on monitoring a downlink channel for an indication using a bandwidth (BW) associated with a first BW configuration. The indication may include a signal to change the receiver BW. The WTRU may change the receiver BW associated with the first BW configuration to a second BW configuration when the WTRU receives the indication on a downlink (DL) channel. The WTRU may perform one or more measurements associated with the second BW configuration in response to the change of the receiver BW to the second BW configuration. The WTRU may transmit measurement information to a network entity. The WTRU may receive a DL transmission from the network using the second BW configuration.

18 Claims, 14 Drawing Sheets

Related U.S. Application Data

(60) Provisional application No. 62/563,440, filed on Sep. 26, 2017, provisional application No. 62/539,057, filed on Jul. 31, 2017, provisional application No. 62/519,249, filed on Jun. 14, 2017, provisional application No. 62/500,785, filed on May 3, 2017, provisional application No. 62/440,262, filed on Dec. 29, 2016, provisional application No. 62/416,235, filed on Nov. 2, 2016.

(51) Int. Cl.
   *H04L 1/1607* (2023.01)
   *H04W 72/0453* (2023.01)
   *H04W 74/00* (2009.01)

(52) U.S. Cl.
   CPC .......... *H04L 1/1671* (2013.01); *H04L 5/0055* (2013.01); *H04L 5/0064* (2013.01); *H04L 5/0087* (2013.01); *H04W 72/0453* (2013.01); *H04W 74/006* (2013.01)

(58) Field of Classification Search
   CPC .............. H04L 5/0064; H04L 5/0087; H04W 72/0453; H04W 74/006
   See application file for complete search history.

(56) References Cited

U.S. PATENT DOCUMENTS

| | | | |
|---|---|---|---|
| 11,722,960 B2* | 8/2023 | Freda | H04W 52/0251 370/311 |
| 2004/0117605 A1 | 6/2004 | Ahmad et al. | |
| 2010/0118836 A1 | 5/2010 | Kazmi et al. | |
| 2012/0182950 A1 | 7/2012 | Chung et al. | |
| 2012/0207040 A1 | 8/2012 | Comsa et al. | |
| 2013/0083753 A1 | 4/2013 | Lee et al. | |
| 2013/0190027 A1* | 7/2013 | Cao | H04W 52/0206 455/509 |
| 2013/0194980 A1* | 8/2013 | Yin | H04L 1/1854 370/280 |
| 2013/0301569 A1 | 11/2013 | Wang et al. | |
| 2013/0322276 A1 | 12/2013 | Pelletier et al. | |
| 2014/0031031 A1 | 1/2014 | Gauvreau et al. | |
| 2014/0056220 A1 | 2/2014 | Poitau et al. | |
| 2014/0056275 A1* | 2/2014 | Behnamfar | H04W 72/1215 370/328 |
| 2014/0153536 A1* | 6/2014 | Ouchi | H04W 52/146 370/329 |
| 2014/0369242 A1 | 12/2014 | Ng et al. | |
| 2015/0063098 A1 | 3/2015 | Yavuz et al. | |
| 2015/0085677 A1* | 3/2015 | Pourahmadi | H04W 52/244 370/252 |
| 2015/0327284 A1* | 11/2015 | Wakabayashi | H04L 1/0026 370/252 |
| 2016/0165595 A1 | 6/2016 | Wang et al. | |
| 2016/0226649 A1* | 8/2016 | Papasakellariou | H04W 4/70 |
| 2016/0241324 A1* | 8/2016 | Blankenship | H05K 999/99 |
| 2017/0026953 A1* | 1/2017 | Wang | H04L 1/0026 |
| 2017/0272220 A1* | 9/2017 | Chen | H04B 7/0417 |
| 2017/0273027 A1 | 9/2017 | Kim et al. | |
| 2017/0338924 A1* | 11/2017 | Islam | H04L 5/0053 |
| 2019/0029071 A1* | 1/2019 | Moon | H04B 7/0617 |
| 2019/0223097 A1* | 7/2019 | Yi | H04W 52/0216 |
| 2019/0260530 A1* | 8/2019 | Yi | H04L 5/0057 |
| 2020/0059345 A1* | 2/2020 | Pelletier | H04L 5/0064 |
| 2023/0025637 A1* | 1/2023 | He | H04L 5/0053 |
| 2023/0164865 A1* | 5/2023 | Kang | H04L 5/0051 370/329 |

FOREIGN PATENT DOCUMENTS

| | | | |
|---|---|---|---|
| CN | 103999528 A | 8/2014 | |
| CN | 104186018 A | 12/2014 | |
| CN | 104350778 A | 2/2015 | |
| CN | 105794280 A | 7/2016 | |

OTHER PUBLICATIONS

3rd Generation Partnership Project (3GPP), R1-1610135, "Evaluation of Frame Structure Design for UE Power", Qualcomm Incorporated, 3GPP TSG-RAN WG1 #86bis, Lisbon, Portugal, Oct. 10-14, 2016, pp. 1-7.

3rd Generation Partnership Project (3GPP), R1-1610177, "DL Control Channels Overview", Qualcomm Incorporated, 3GPP TSG-RAN WG1 #86bis, Lisbon, Portugal, Oct. 10-14, 2016, pp. 1-6.

3rd Generation Partnership Project (3GPP), R1-164664, "Framework for Forward Compatible NR Design", InterDigital Communications, 3GPP TSG-RAN WG1 #85, Nanjing, China, May 23-27, 2016, pp. 1-3.

3rd Generation Partnership Project (3GPP), R1-167327, "Forward Compatible Control Channel Framework for NR", InterDigital Communications, 3GPP TSG-RAN WG1 #86, Goteborg, Sweden, Aug. 22-26, 2016, pp. 1-5.

3rd Generation Partnership Project (3GPP), R1-1704091, "Reply LS on UE RF Bandwidth Adaptation in NR", RAN WG4, 3GPP TSG-RAN WG1 Meeting #88, Athens, Greece, Feb. 13-17, 2017, 2 pages.

3rd Generation Partnership Project (3GPP), R4-153578, "On eMTC UE Fast Retuning Time and Potential Benefit to the Network", Intel Corporation, 3GPP TSG-RAN WG4 Meeting #75, Fukuoka, Japan, May 25-29, 2015, 6 pages.

Third Generation Partnership Project (3GPP), "Corrections and alignment additions to the Data Session Control SCF", 3GPP TSG_CN5 (Open Service Access—OSA), Meeting #15, Cancun, Mexico, Nov. 26-30, 2001, N5-011244, 30 pages.

* cited by examiner

RECEIVER BANDWIDTH ADAPTATION

CROSS-REFERENCE TO RELATED APPLICATIONS

This application is a continuation of U.S. Non-Provisional application Ser. No. 16/345,762, filed Apr. 29, 2019, which is the National Stage entry under 35 U.S.C. § 371 of Patent Cooperation Treaty Application PCT/US2017/058754, filed Oct. 27, 2017, which claims the benefit of U.S. Provisional Application Ser. No. 62/416,235 filed Nov. 2, 2016, U.S. Provisional Application Ser. No. 62/440,262 filed Dec. 29, 2016, U.S. Provisional Application Ser. No. 62/500,785 filed May 3, 2017, U.S. Provisional Application Ser. No. 62/519,249 filed Jun. 14, 2017, U.S. Provisional Application Ser. No. 62/539,057 filed Jul. 31, 2017, and U.S. Provisional Application Ser. No. 62/563,440 filed Sep. 26, 2017, the contents of which are incorporated by reference herein, and this application claims benefit of the filing date of these priority applications.

BACKGROUND

Mobile communications continue to evolve. A fifth generation may be referred to as 5G. A previous (legacy) generation of mobile communication may be, for example, fourth generation (4G) long term evolution (LTE).

SUMMARY

Systems, methods, and instrumentalities are disclosed for receiver bandwidth adaptation for radio access technologies (RATs), such as New Radio (NR) or 5G flexible RAT. Wireless transmit/receive unit (WTRU) control channel (e.g., WTRU control channel receiver) bandwidth may adapt or change, for example, based on WTRU activity (e.g., based on activity timer, etc.). A WTRU may send an explicit acknowledgement (ACK) and/or a channel quality indicator (CQI), for example, to acknowledge a receiver bandwidth adaptation (e.g., a change in receiver bandwidth). A WTRU may change (e.g., autonomously change) its receiver bandwidth, for example, based on one or more of the following activities: new data in a buffer, buffer status report (BSR) transmission, physical random access channel (PRACH) transmission, change of radio resource control (RRC) state, and/or the like.

A WTRU property of sound reference signal (SRS) may depend on, for example, a WTRU receiver (RX) bandwidth (e.g., RX-TX bandwidth linked). Relative indexing may be based on, for example, WTRU RX bandwidth and a reference point configuration (e.g., absolute reference point configuration). A WTRU control resource set and/or parameters (e.g., downlink control indications (DCI) format) may depend on, for example, WTRU RX bandwidth (e.g., frequency resource bit field). Bandwidth adaptation may be performed for a WTRU with multiple carriers (e.g., multiple component carriers) and/or multiple control resource sets. A control resource set may be scaled (e.g., based on WRTU receiver bandwidth). A WTRU may indicate a network of retuning time requirements (e.g., based on configured bandwidth parts). A WTRU may reject a configuration (e.g., when a downlink (DL) reception gap is too short). Receiver bandwidth adaptation may be implemented, for example, in a WTRU and/or network layers (e.g., L1 and/or L2). Receiver bandwidth adaptation may improve control channel operation and may reduce power consumption. A WTRU may transmit an acknowledgement (e.g., an explicit acknowledgement). For example, a WTRU may transmit an explicit acknowledgement when the WTRU receives an explicit change of bandwidth (e.g., via DCI with no associated data allocation). A WTRU may report its retuning time based on, for example, whether the bandwidth part (BWP) is within the same BWP set (e.g., set for which a WTRU may not retune) or outside of the BWP set. A WTRU may manage bandwidth (BW) and/or BWP based on one or more power saving procedures (e.g., discontinuous reception (DRX)).

In examples, a WTRU may monitor a DL channel for an indication using a receiver BW associated with a first BW configuration. The indication may include a signal to change the receiver BW. The indication may include a DL control information received on a DL control channel. The WTRU may change the receiver BW associated with the first BW configuration to a second BW configuration. For example, the WTRU may change the receiver BW associated with the first BW configuration to a second BW configuration on a condition that the WTRU receives the indication on the DL channel. The WTRU may perform one or more measurements associated with the second BW configuration in response to the change of the receiver BW to the second BW configuration. The one or more measurements may be performed on a sounding signal or other reference signals and may be used to generate a channel state information (CSI) report. The WTRU may transmit measurement information and/or the CSI report associated with the second BW configuration to a network entity. Transmitted measurement information may indicate (e.g., implicitly indicate) an acknowledgement of the change in the receiver BW by the WTRU. The WTRU may receive a DL transmission from the network using the second BW configuration. The second BW configuration (e.g., operational BW) may be associated with a wider bandwidth than the first BW configuration (e.g., low power BW). The first BW configuration may allow the WTRU to perform reception using a less power than is used to perform reception using the second bandwidth configuration. The WTRU may reapply the first BW configuration after a period of inactivity.

BRIEF DESCRIPTION OF THE DRAWINGS

FIG. 10 is an example of a WTRU providing retuning requirements to a network.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
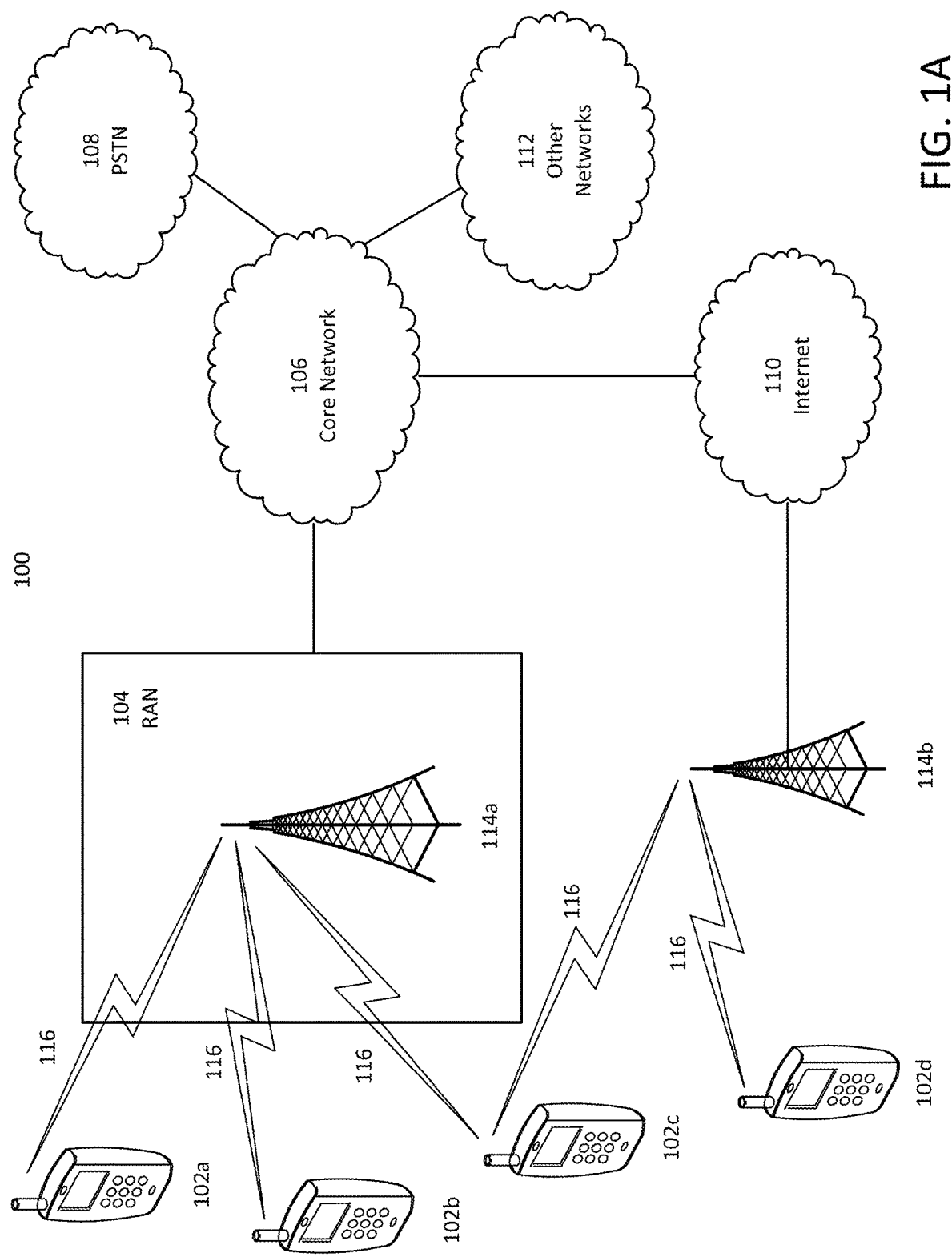
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
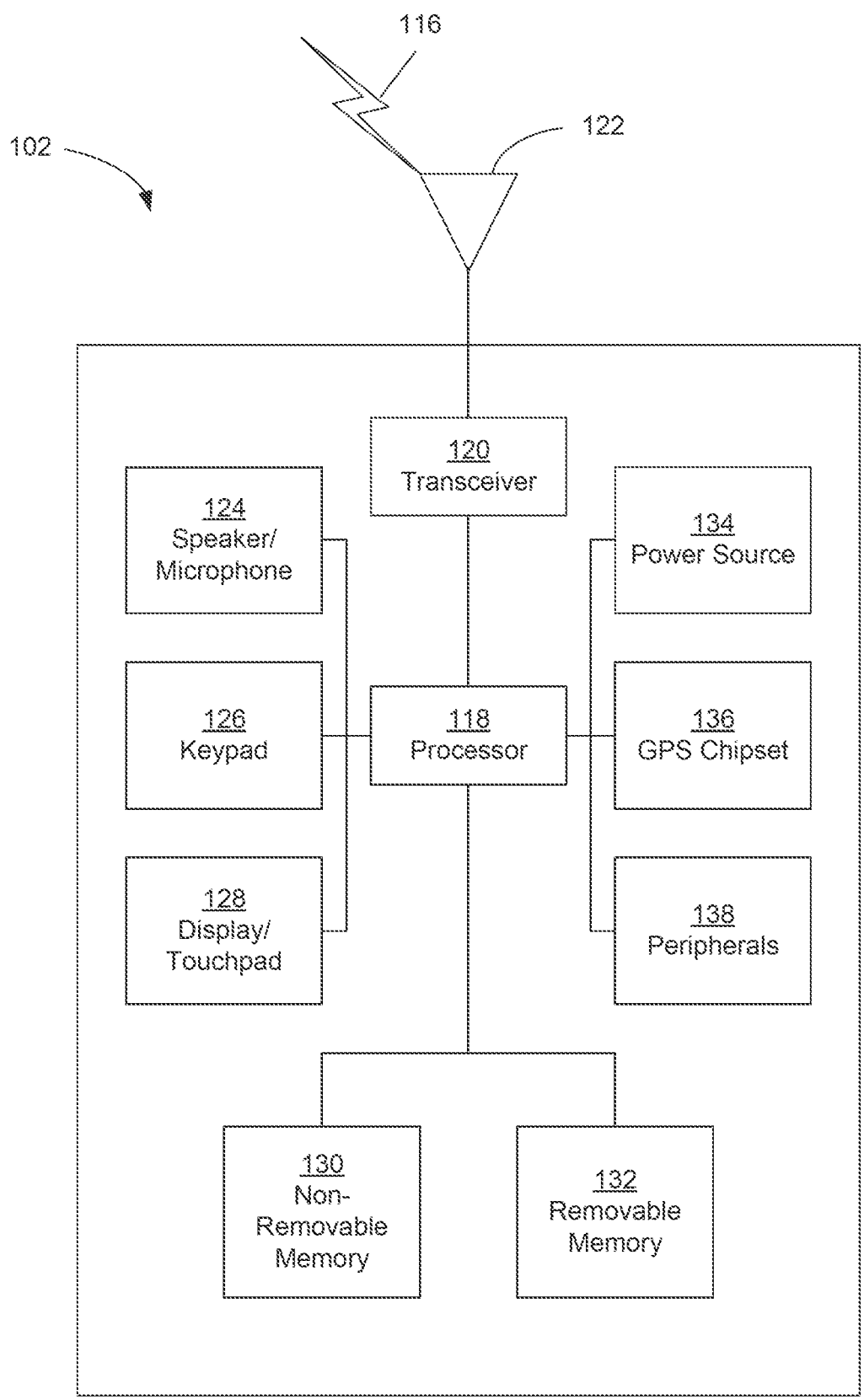
FIG. 1B is a system diagram illustrating an example wireless transmit/receive unit (WTRU) that may be used within the communications system illustrated in FIG. 1A according to an embodiment.
Figure 1C:
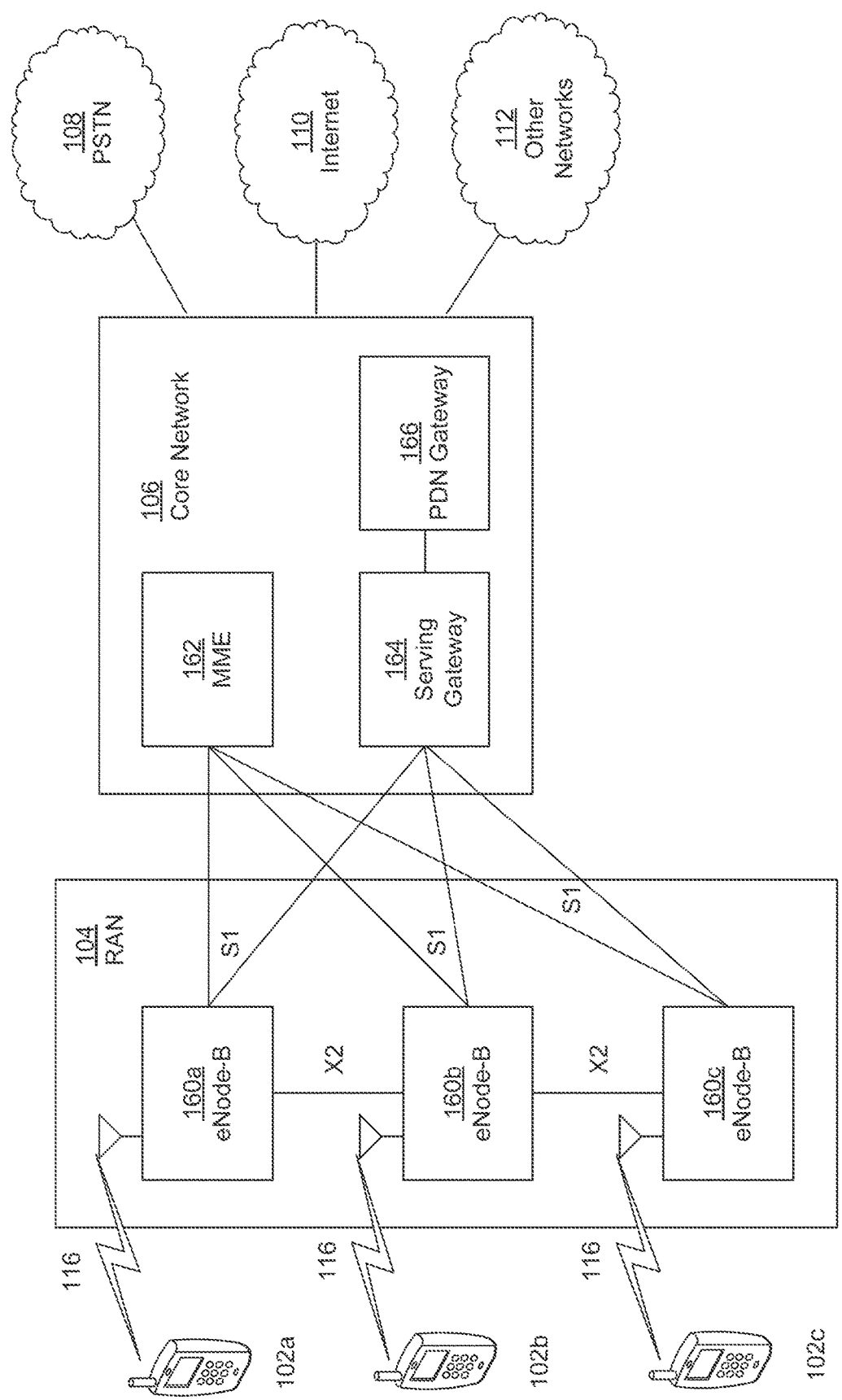
FIG. 1D is a system diagram illustrating a further example RAN and a further example CN that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 10:
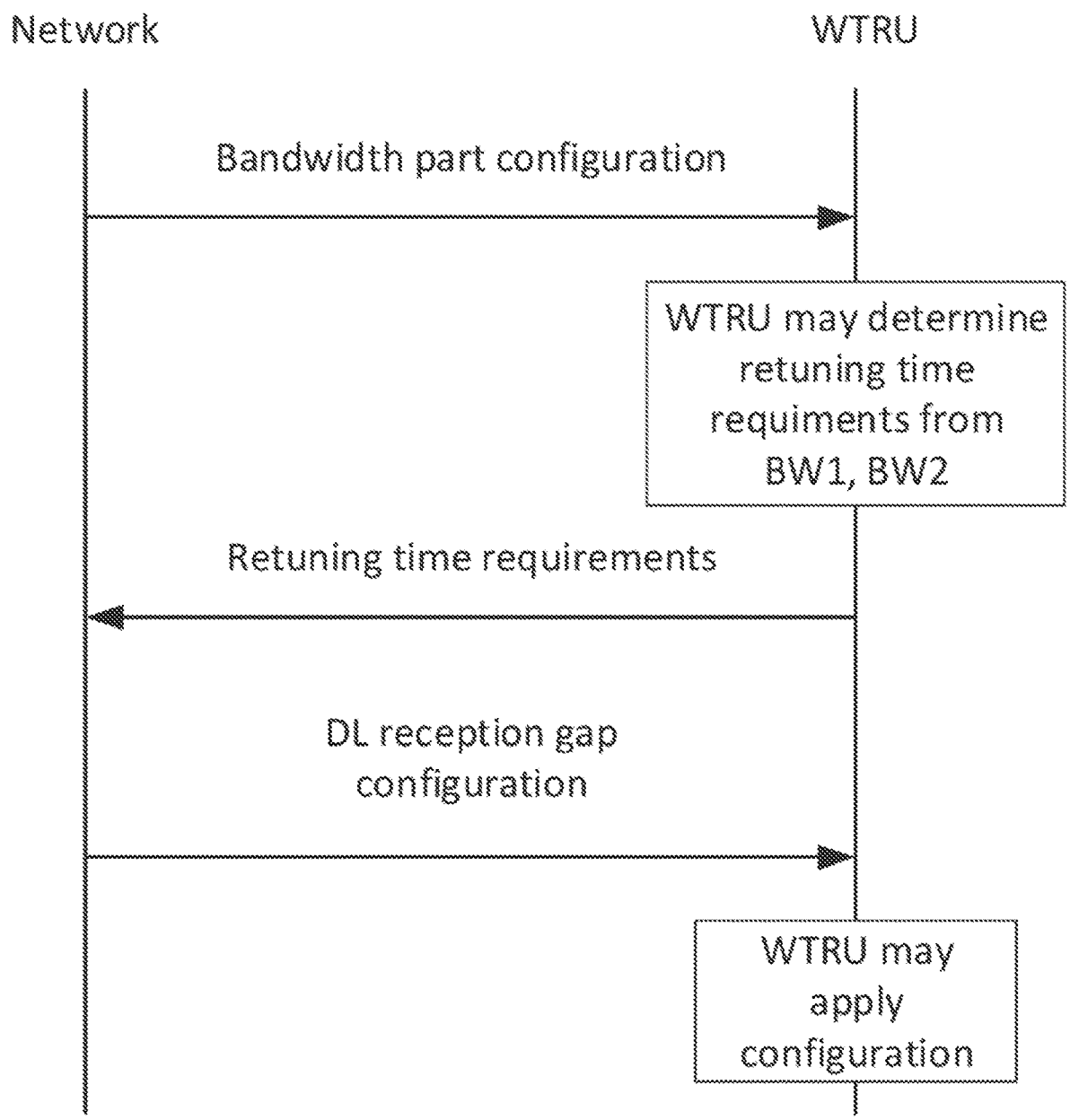
FIG. 10 is a system diagram illustrating an example radio access network (RAN) and an example core network (CN) that may be used within the communications system illustrated in FIG. 1A according to an embodiment.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
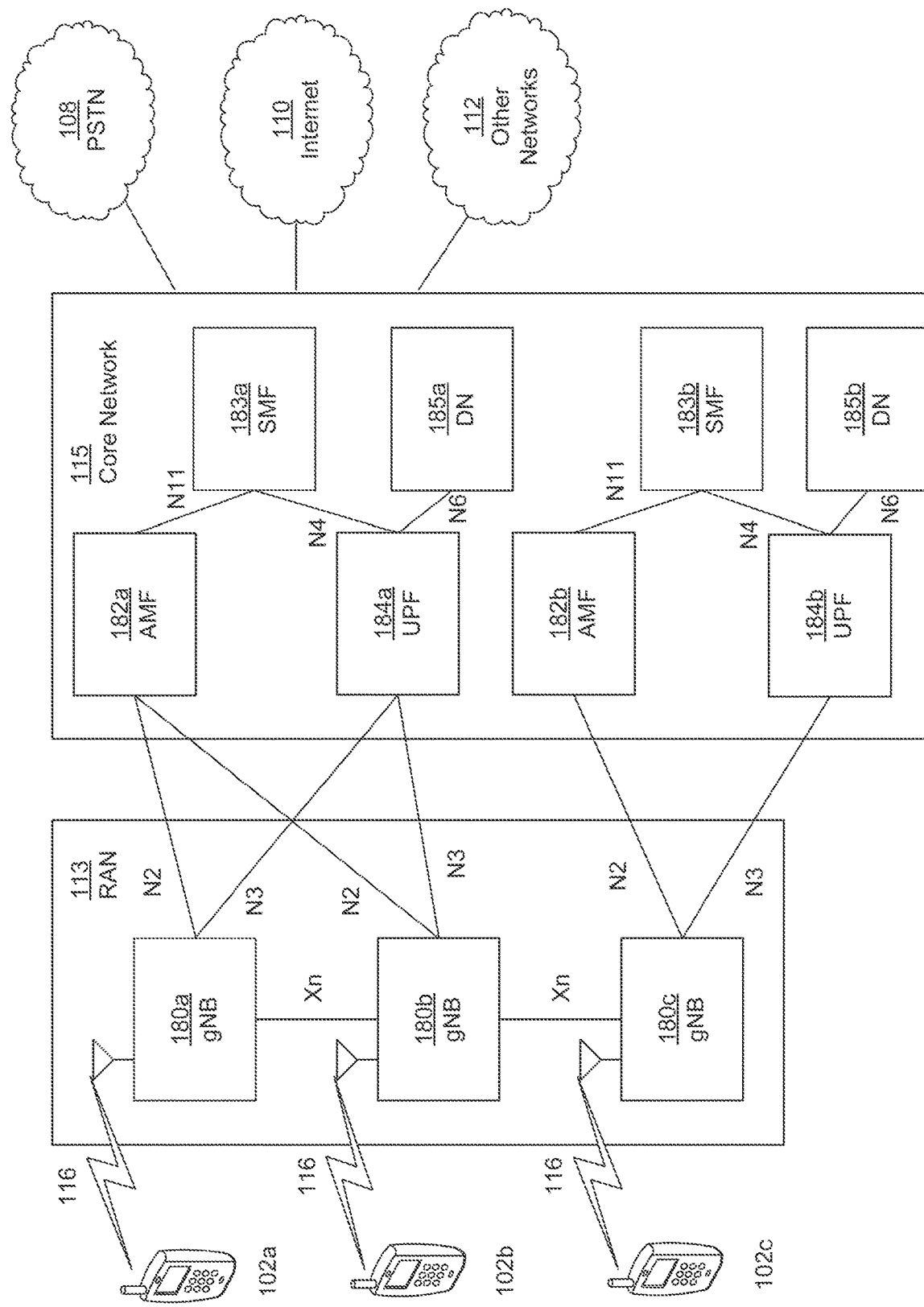

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Mobile wireless communications may implement a variety of radio access technologies (RATs), such as New Radio (NR) or 5G flexible RAT. Use cases for NR may include, for example, extreme Mobile Broadband (eMBB), Ultra High Reliability and Low Latency Communications (URLLC), and massive Machine Type Communications (mMTC). NR implementations may be energy-efficient.

In examples of mobile wireless system, a user equipment (UE), e.g., a WTRU, may know when to receive and/or transmit data, e.g., via reception of Downlink Control Indications (DCIs) that may be transmitted on a separate control channel. DCI may not carry many bits. An eNB may, at any point in time, schedule multiple devices. Physical Downlink Control CHannel (PDCCH) may be dimensioned accordingly.

In examples (e.g., LTE), a PDCCH may be transmitted over a system bandwidth (e.g., entire system bandwidth) on the first few symbols of a (e.g., each) subframe. This approach may permit an eNB to schedule DCIs over the entire system bandwidth. This approach may require a WTRU to search over the entire bandwidth for a potential DCI. This may require that the WTRU receives the entire bandwidth for a potentially small DCI. This may be inefficient from a battery consumption perspective, e.g., given that a WTRU receiver may process more samples than necessary.

In examples (e.g., NR) a DCI (e.g., or other indication) may be scheduled over a smaller bandwidth than the entire system bandwidth and/or frequency location (e.g., a bandwidth part (BWP)). A set of subbands over which a PDCCH is transmitted may be WTRU-specific. A WTRU may (e.g., upon network indication) increase its receiver bandwidth and/or change its frequency location (e.g., center frequency). The system may use large bandwidth operations. The system may spread the system load in different sets of resources for a given cell and/or carrier. This approach (e.g., receiver bandwidth adaptation) may not require one or more (e.g., all) WTRUs to have a capability to receive the entire system bandwidth and/or may enable lower power consumption, and may be referred to as receiver bandwidth adaptation. A WTRU's receiver bandwidth may change (e.g., increase and/or decrease). An increase and/or a decrease in the WTRU's receiver bandwidth may imply (e.g., further imply) a change in frequency location (e.g., center frequency). Such change may correspond to a change of BWP (e.g., UL, DL or both) or to a change of the active set of BWPs (e.g., UL, DL or both). A change in the WTRU's receiver bandwidth may be for downlink operation and/or determination of the WTRU's uplink bandwidth operation A WTRU may be configured with one or more bandwidth parts (BWPs) for a given cell and/or carrier. One or more BWPs may be groups as a set of BWPs. A set of BWPs may be for downlink operation (DL BWP) or for uplink operation (UL BWP). A BWP may be characterized by at least one or more of the following: a subcarrier spacing; a cyclic prefix; and/or a number of contiguous physical resource blocks (PRBs). The one or more characteristics may be configuration aspects of the WTRU. A BWP may be characterized (e.g., further characterized) by a frequency location, e.g., a center frequency.

A WTRU may implement receiver bandwidth adaptation, for example, by retuning its receiver chain when (e.g., every time) there is a change in bandwidth and/or frequency location (e.g., center frequency). While the retuning time may be short, retuning may lead to data losses, for example, when not handled properly by an eNB and/or WTRU (e.g., UE). Data losses associated with bandwidth adaptations may be prevented or mitigated, for example, by implementing one or more of the following: (i) triggers and/or rules for changing receiver bandwidth and/or frequency location (e.g., center frequency); (ii) specific time instances when a WTRU may retune (e.g., and/or may not receive at least some transmission); (iii) receiver bandwidth state coherency between WTRU and network (NW); and/or (iv) channel state information.

Resources for a control channel region may change, for example, depending on receiver bandwidth used and/or frequency location (e.g., center frequency). Procedures may be provided for a WTRU to determine control channel resources (e.g., a control channel resource set or CORE-SET).

In an example (e.g., NR with beamforming), a beam used for transmission of a first control channel region may not be appropriate after a WTRU has retuned, for example when the WTRU uses a different bandwidth and/or frequency location (e.g., center frequency). This may be problematic, for example, in a deployment where beamforming gain may be important (e.g., essential) in closing a link budget.

Figure 2:
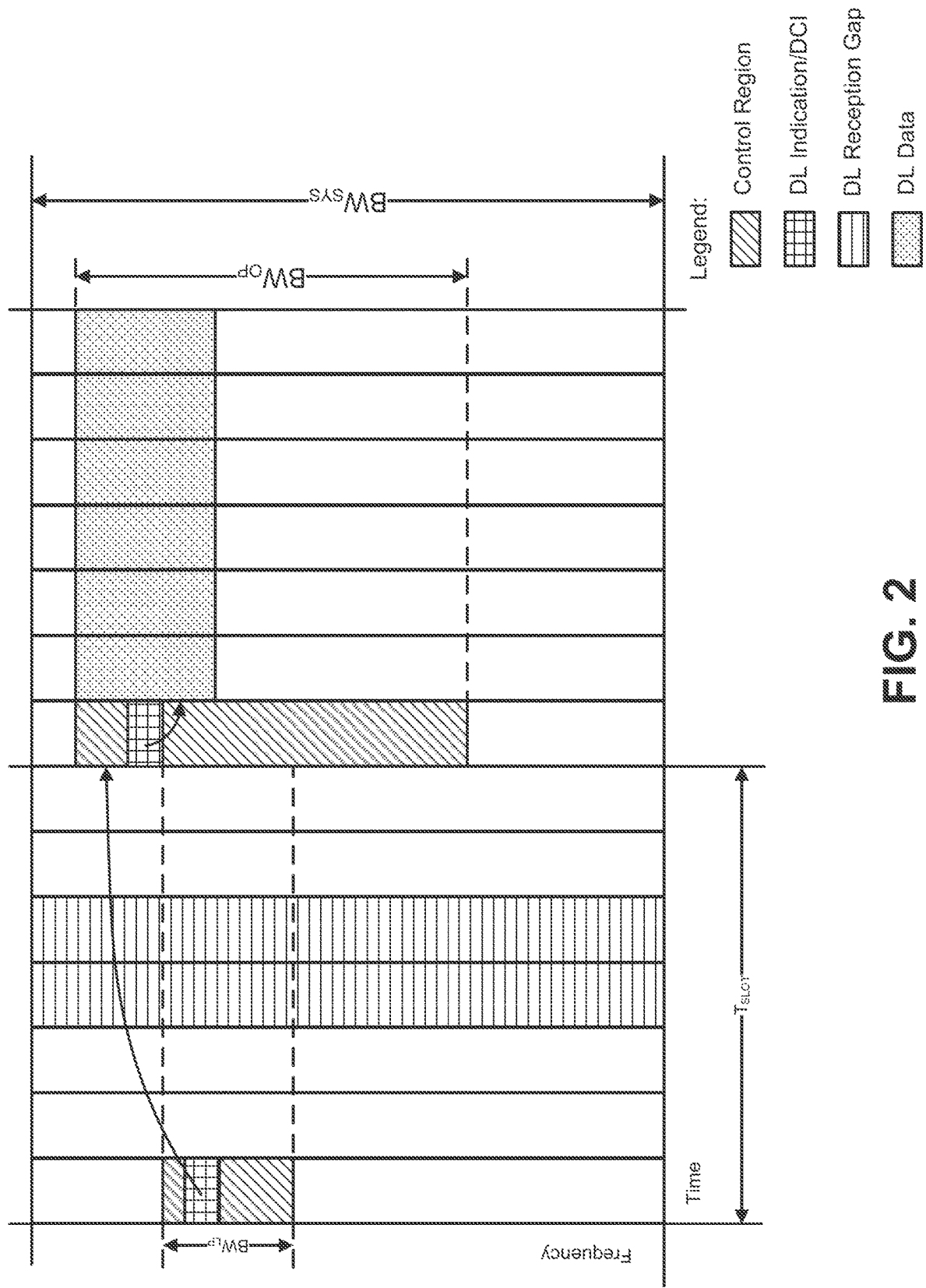
FIG. 2 is an example of receiver bandwidth adaptation.

FIG. 2 is an example of receiver bandwidth adaptation. FIG. 2 illustrates a downlink time-frequency grid. $BW_{LP}$ may be WTRU (e.g., low power) receiver bandwidth. $BW_{OP}$ may be WTRU operating bandwidth. $BW_{SYS}$ may be system bandwidth. $T_{SLOT}$ may be the time for a slot (e.g., 7 OFDM symbols per slots in the example shown in FIG. 2).

A WTRU may receive a first downlink (DL) indication (e.g., a DCI or other indication), which may result in the WTRU changing its receiver bandwidth from $BW_{LP}$ to $BW_{OP}$ (e.g., increasing receiver bandwidth to a nominal operation level). A WTRU may operate with $BW_{OP}$ (e.g., normally) with reception of other DCIs and/or associated data. The first indication may be followed by a downlink reception gap. During the downlink reception gap time, the WTRU may retune its receiver. The WTRU may not be expected to receive information (e.g., DCIs and/or data) while retuning its receiver.

When a WTRU's bandwidth adaptation mechanism includes (e.g., further includes) a change in frequency location (e.g., center frequency) for the operation bandwidth for a given cell and/or carrier, one or more examples of receiver bandwidth adaptation described herein may apply.

A number of pre-defined transmissions or slot formats and fixed timelines may be defined and used to enable bandwidth adaptation. A DL control channel bandwidth adaptation slot format may include one or more of the following elements: (i) control region (e.g., control resource set), (ii) data region, (iii) DL Reception Gap (e.g., for re-tuning), (iv) reference signal (RS) region (e.g., demodulation-RS (DM-RS) or other), and/or (v) uplink control/data region.

Figure 3:
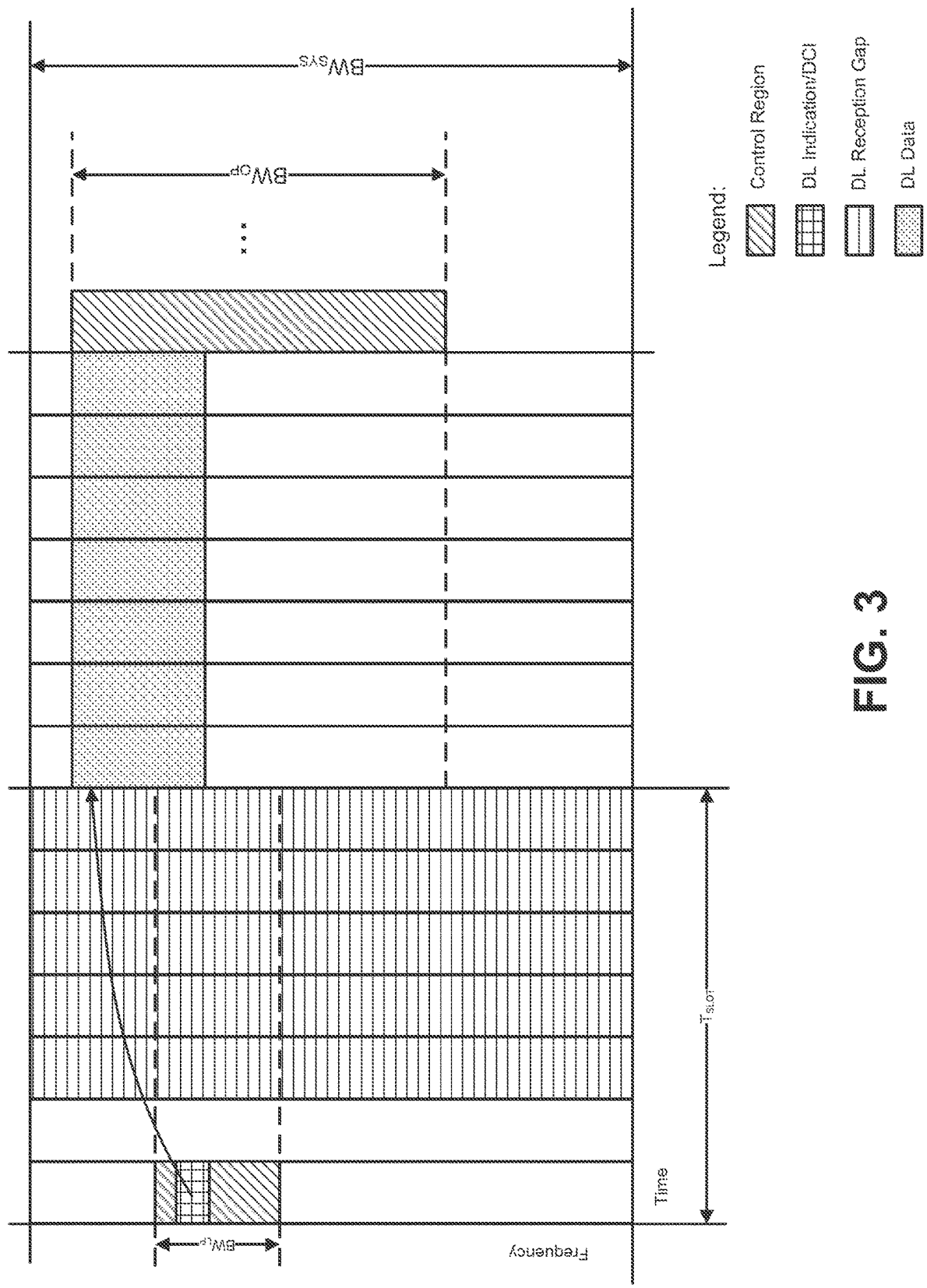
FIG. 3 is an example of receiver bandwidth adaptation with cross-slot scheduling.

FIG. 3 is an example of receiver bandwidth adaptation with cross-slot scheduling. In an example, a DCI in a control region in $BW_{LP}$ may indicate the location of different elements of a slot. An indication may be accompanied by a downlink assignment in the slot (e.g., for transmission before and/or after a DL reception gap). A DCI in $BW_{LP}$ may (e.g., may also) indicate a downlink assignment in the next slot where $BW_{OP}$ may be applicable. The first slot where $BW_{OP}$ (e.g., only $BW_{OP}$) is used may not have a control channel region (e.g., all symbols may be used for data transmission). A control channel region may be present. For example, a control channel region may be present for slots beyond the first slot where $BW_{OP}$ (e.g., only $BW_{OP}$) may be used (e.g., a slot without a retuning gap).

Receiver bandwidth adaptation slot formats may be provided. Different slot formats may be defined depending on, for example, the number of symbols per slot and/or the duplexing scheme (e.g., time division duplex (TDD) vs frequency division duplex (FDD)). Receiver bandwidth adaption slot formats may be configured by a network.

A WTRU may determine that a receiver bandwidth adaptation slot format is being used for example by the content of the DCI. In an example, a WTRU may determine that a current slot (e.g., and one or more following slots) may be a receiver bandwidth adaptation slot(s), for example, when the DCI includes an explicit indication for change of WTRU receiver bandwidth.

A WTRU may be configured with one or more receiver bandwidth adaptation slot formats. In examples, a WTRU may determine a receiver bandwidth adaptation slot format (e.g., dynamically). For example, the WTRU may determine a receiver bandwidth adaptation slot format dynamically based on an explicit indication or field in the DCI or based on an implicit rule based on the content of the DCI. In examples, a single receiver bandwidth adaptation slot format may be configured. A WTRU may determine a receiver bandwidth adaptation slot format. For example, a WTRU may determine a receiver bandwidth adaptation slot format based on a configuration, which may be fixed in the specification(s) or semi-statically configured.

There may be multiple receiver bandwidth adaptation slot formats. While examples may refer to a specific number of OFDM symbols in a slot and while example signals may use the entire $BW_{LP}$ bandwidth, the subject matter described herein may not be limited to these examples. One or more implementations may use the same or different number of OFDM symbols and/or signal bandwidth described in various examples. While examples may refer to an FDD system, subject matter described herein may be applicable to TDD operations.

Figure 4:
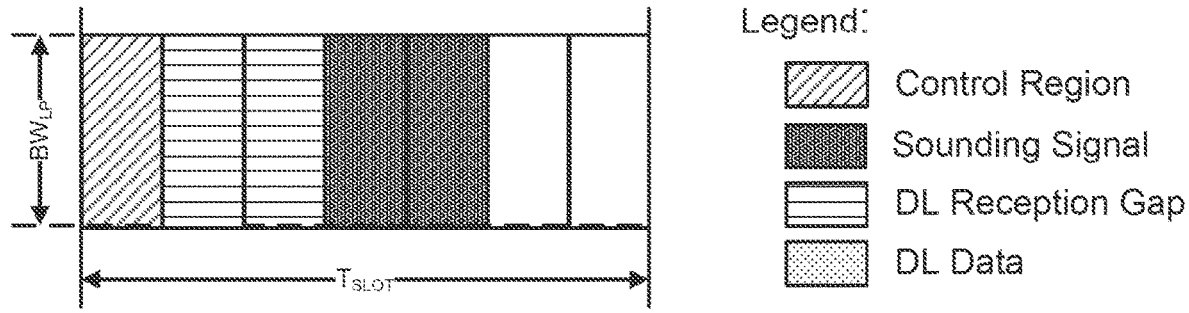
FIG. 4 is an example receiver bandwidth adaptation slot format with a sounding signal.

FIG. 4 is an example receiver bandwidth adaptation slot format with a sounding signal. This receiver bandwidth adaptation slot format may enable a change of receiver bandwidth on the WTRU side and/or may enable the WTRU to make a measurement before starting to receive data on the downlink. An eNB may (e.g., with proper reporting) be able to use the measurement for scheduling data at a later time, such as on the next slot (e.g., with WTRU using $BW_{OP}$).

The sounding signal (e.g., in this context) may include a DM-RS, a cell-specific reference signal (CRS), a channel state information-RS (CSI-RS), a positioning reference signal (PRS), or a primary synchronization signal (PSS)/secondary synchronization signal (SSS). In examples, a sounding signal may include a sequence of signals used to perform a beamforming search/adaptation procedure. This may be implemented, for example, when a WTRU and/or network may be configured with a large number of antennas.

In examples, a WTRU may be configured to change its receiving and/or transmitting beam after a radio has re-tuned. This may be accomplished, for example, based on a sounding signal or beamforming adaptation procedure. A network may (e.g., also) change its transmission beam, which may depend on a WTRU CQI feedback.

In examples, a WTRU may receive more than one sounding signal or CSI-RS. This may be implemented, for example, when a WTRU is in the vicinity of multiple total radiant powers (TRPs) or may be served by multiple beams. A WTRU may receive a set of sounding signals from each TRP or representing different beams. A WTRU may be configured to transmit multiple CQIs in response (e.g., one for each relevant sounding signal it received or based on the WTRU configuration).

In examples, a sounding signal may be used by a WTRU for synchronization purposes.

Figure 5:
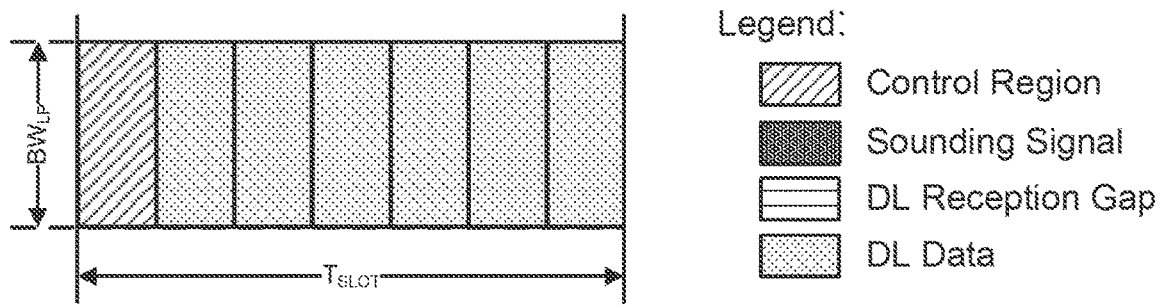
FIG. 5 is an example receiver bandwidth adaptation slot format with data.

FIG. 5 is an example receiver bandwidth adaptation slot format with data. A DCI may indicate that a WTRU may (e.g., should or must) change receiver bandwidth to $BW_{OP}$. A DCI may (e.g., also) indicate DL data reception parameters, e.g., during the slot or at a later time.

In examples, a WTRU may not be provided with an explicit downlink reception gap. A WTRU may retune (e.g., at any time) during the data reception period. Data may be encoded, for example, to protect it from the WTRU retuning gap, e.g., to avoid data loss. Data may be transmitted or encoded with a low code rate, which may permit recovery from errors resulting from the WTRU retuning gap. Data may (e.g., optionally) be encoded (e.g., further encoded), for example, using an outer-code, such as a reed-solomon code or other code (e.g., fountain code). A WTRU may determine data encoding (e.g., an outer-code and/or other code applied to a transmission) based on, for example, an explicit indication (e.g., on the DCI format). A WTRU may determine data encoding (e.g., an outer-code and/or other code applied to a transmission), for example, implicitly (e.g., based on a receiver bandwidth adaptation slot format that may be selected or during a slot which receiver bandwidth is changed).

Figure 6:
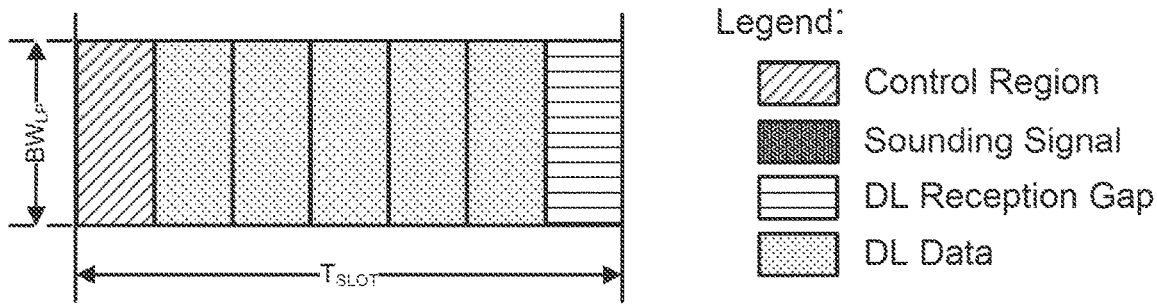
FIG. 6 is an example receiver bandwidth adaptation slot format with a tuning gap at the end.

FIG. 6 is an example receiver bandwidth adaptation slot format with a tuning gap (e.g., at the end). In an example, a DL Reception Gap may be included in one or more of the last symbol(s) of the slot, e.g., to mitigate potential data losses due to retuning.

Figure 7:
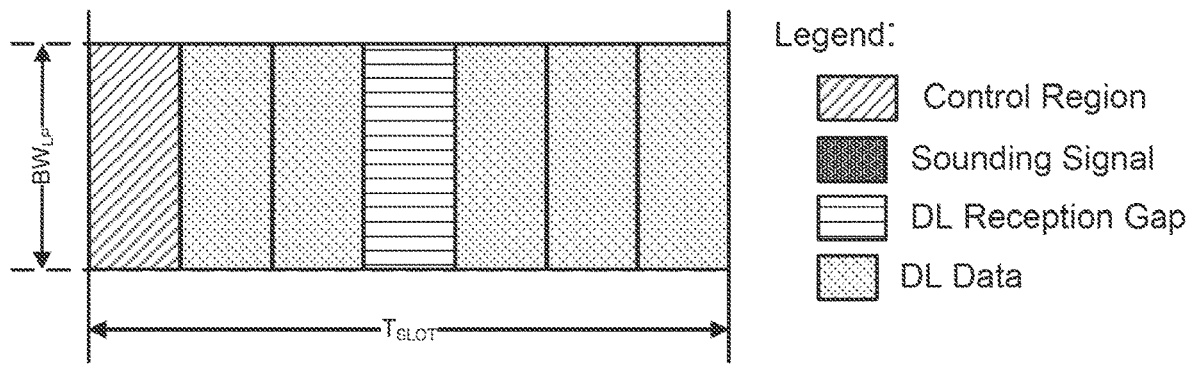
FIG. 7 is an example receiver bandwidth adaptation slot format with tuning gap within a data period.

FIG. 7 is an example receiver bandwidth adaptation slot format with tuning gap within a data period. In an example, a transport block (TB) may be mapped to portions before and after a tuning gap, e.g., using resource element (RE) puncturing or rate matching to accommodate the tuning gap. The position of a gap within a slot may be indicated by downlink control signaling. A TB may be mapped differently before and after a retuning gap. For example, (e.g., in symbols preceding a retuning gap) a frequency allocation may be restricted to receiver bandwidth at the beginning of a slot, while a frequency allocation may be restricted to the receiver bandwidth at the end of the slot (e.g., in subsequent symbols). Separate frequency allocations may be provided for OFDM symbols before and after a retuning gap. A single frequency allocation may (e.g., alternatively) be provided. Portions falling outside a receiver bandwidth before or after a gap may be excluded (e.g., implicitly excluded). In examples, the data portion of a slot may be split in two by a retuning gap. A (e.g., each) portion may enable the transmission of a different TB.

Figure 8:
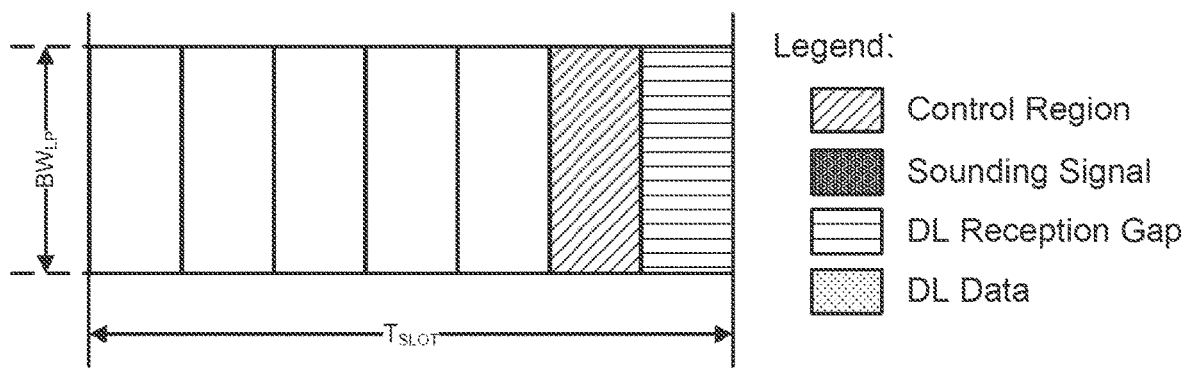
FIG. 8 is an example receiver bandwidth adaptation slot format for a low latency change of receiver bandwidth.

FIG. 8 is an example receiver bandwidth adaptation slot format for a low latency change of receiver bandwidth. A control region that a WTRU may monitor for a change of receiver bandwidth indication may be located towards the end of a slot, e.g., with a DL Reception Gap at the end.

Figure 9:
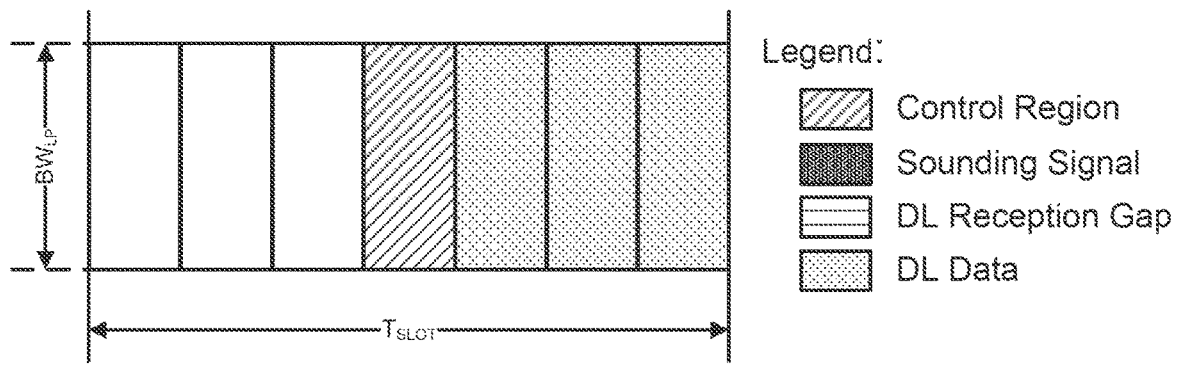
FIG. 9 is an example of a low-latency receiver bandwidth adaptation slot format with data.

FIG. 9 is an example of a low-latency receiver bandwidth adaptation slot format with data. A control region may be located in the middle of a slot and may be followed by a downlink data region for a WTRU. A slot format may (e.g., alternatively) have a DL Reception Gap at the end of the slot.

In examples, a WTRU may be configured with a fixed set of receiver bandwidth adaptation slot formats (e.g., indexed in a table). A WTRU may be configured to monitor/operate according to the configured format. A WTRU may (e.g., alternatively) be configured with sets of control regions to monitor. A DCI may provide a dynamic indication of a receiver bandwidth adaptation slot format (e.g., with data or without data).

In examples, receiver bandwidth adaptation slot formats may (e.g., alternative to predefinition in a table) be configured (e.g., configured explicitly) by a network. A network may explicitly configure a WTRU with each field of a receiver bandwidth adaptation slot format. For example, a network may configure each OFDM symbol of a slot with a specific function (e.g., control region, sounding signal, DL reception gap, DL data, and/or the like).

A WTRU may be configured with one or more receiver bandwidth adaptation slot formats that may span one or more (multiple) slots. A transmission format may span a duration of one or more than one slot.

The duration of a transmission format (e.g., in terms of OFDM symbols or in terms of absolute time) may depend on, for example, subcarrier spacing. Different formats may be defined for (e.g., each) subcarrier spacing.

Receiver bandwidth adaptation slot format may be associated with (e.g., may depend on) one or more service types. For example, a specific set of receiver bandwidth adaptation slot formats may be associated with eMBB, mMTC, and/or URLLC type of services.

In an example, a WTRU may be configured with a specific set of receiver bandwidth adaptation slot formats based on, for example, one or more logical channel QoS parameters. For example, a transport channel may use a receiver bandwidth adaptation slot format of the highest priority logical channel associated with the data being transmitted or the highest priority logical channel configured.

A WTRU and/or network entity may be configured to support multiple transmitter and/or receiver bandwidth configurations. For example, a WTRU may be configured with one or more receiver bandwidth configurations. In an example, rather than or in addition to the WTRU being configured to operate using a special slot format (e.g., for a given set of physical resources), the WTRU may utilize multiple receiver bandwidth configurations. A receiver bandwidth configuration may comprise of one or more of the following elements: frequency parameters (such as, for example, a set of physical resource blocks (PRBs), bandwidth, and/or center frequency/offset PRB) and/or associated control resource set(s).

A WTRU may be configured with a gap duration (e.g., upon reconfiguration from one receiver bandwidth to another). A gap duration may depend, for example, on whether the center frequency is changed between the two configurations. The gap duration may correspond to the time during which the WTRU switches from a first receiver bandwidth configuration to a second receiver bandwidth configuration.

A WTRU may be configured to monitor a control resource set(s) that may be within the range of the receiver bandwidth, e.g., upon change of receiver bandwidth configuration. This may be in addition to the WTRU being configured with new frequency parameters.

A WTRU bandwidth receiver configuration may be determined, e.g., based on characteristics of configured control resource set. A WTRU may be configured to determine the WTRU receiver bandwidth, e.g., based on the characteristics of the active control resource set(s). In an example, the WTRU may be configured with an operating bandwidth that may be a function of the control information addressable set of PRBs (e.g., based on the bandwidth size of the control region corresponding to the control resource set).

A WTRU may be configured to determine the active control resource set bandwidth (e.g., based on configuration). A WTRU may be configured to determine the receiver bandwidth, for example, using a configured multiplicative factor β (e.g., the receiver bandwidth=β×control resource set bandwidth). In an example, the multiplicative factor β=1. If the multiplicative factor β=1, the WTRU may use the same receiver bandwidth as the active control resource set bandwidth.

A WTRU may be configured to determine a center frequency. In an example, the WTRU may determine the center frequency based on the active control resource set (e.g., using the center frequency associated to the active control resource set).

A WTRU may be configured to determine a receiver gap duration.

A WTRU receiver retuning time may, for example, depend on whether a center frequency may (e.g., does) change and/or (e.g., potentially) other implementation-specific factors. In an example, a WTRU receiver may be implemented (e.g., in support of very wide bandwidth), with a wideband RF front-end (e.g., single wideband RF front-end) and/or with multiple narrowband RF front-ends that (e.g., together or cumulatively) may (e.g., would) cover a receiver bandwidth (e.g., an entire receiver bandwidth). Various WTRU implementations may be equivalent, but may involve (e.g., require) different retuning time configurations, for example, when subjected to changes in bandwidth. In an example, (e.g., for sub-6 GHz intraband), a tuning gap of 20 μs may be implemented (e.g., may be necessary), for example, to change bandwidth. A tuning gap between 50-200 μs may be implemented, for example, when (e.g., in addition) a center frequency is changed.

Network configuration of excessively conservative downlink reception gaps may result in lower overall WTRU throughput. A network may be aware of WTRU capabilities with respect to bandwidth adaptation and retuning. It may be difficult for a network to determine an appropriate downlink reception gap ahead of time, for example, given that retuning time may depend on bandwidth configurations and WTRU implementation.

In examples, a WTRU may be configured with multiple (e.g., two or more) bandwidth configurations or bandwidth part configurations (e.g., for bandwidth adaptation). A bandwidth part configuration for bandwidth adaptation may comprise, for example, at least two bandwidth or set of PRBs that may be associated with a bandwidth part (e.g., the same bandwidth part). In examples, multiple (e.g., two) bandwidths may share a same center frequency. For simplicity, any set, group or multiple (e.g., two) different bandwidth allocations may be referred to as bandwidth configurations (e.g., regardless how they may be configured or modeled).

In examples (e.g., assuming two bandwidth configurations for simplicity), a WTRU may be configured with a first bandwidth (BW1) and a second bandwidth (BW2). A bandwidth configuration (e.g., for bandwidth adaptation) may include, for example, a start and end frequency or PRB index, or a starting frequency or PRB index and a bandwidth (e.g., in terms of PRBs or other).

FIG. 10 is an example of a WTRU providing retuning requirements to a network. A WTRU may be configured with a bandwidth part (BWP) pair and may report a retuning time (e.g., a time period utilized by the WTRU to retune its transceiver) to a network. A WTRU may determine a retuning time, for example, when going from BW1 to BW2 and/or vice versa. A WTRU may report a (e.g., required) retuning time to a network (e.g., via an index in a table of possible values). A network (NW) may (e.g., then appropriately) configure a DL reception gap.

Figure 11:
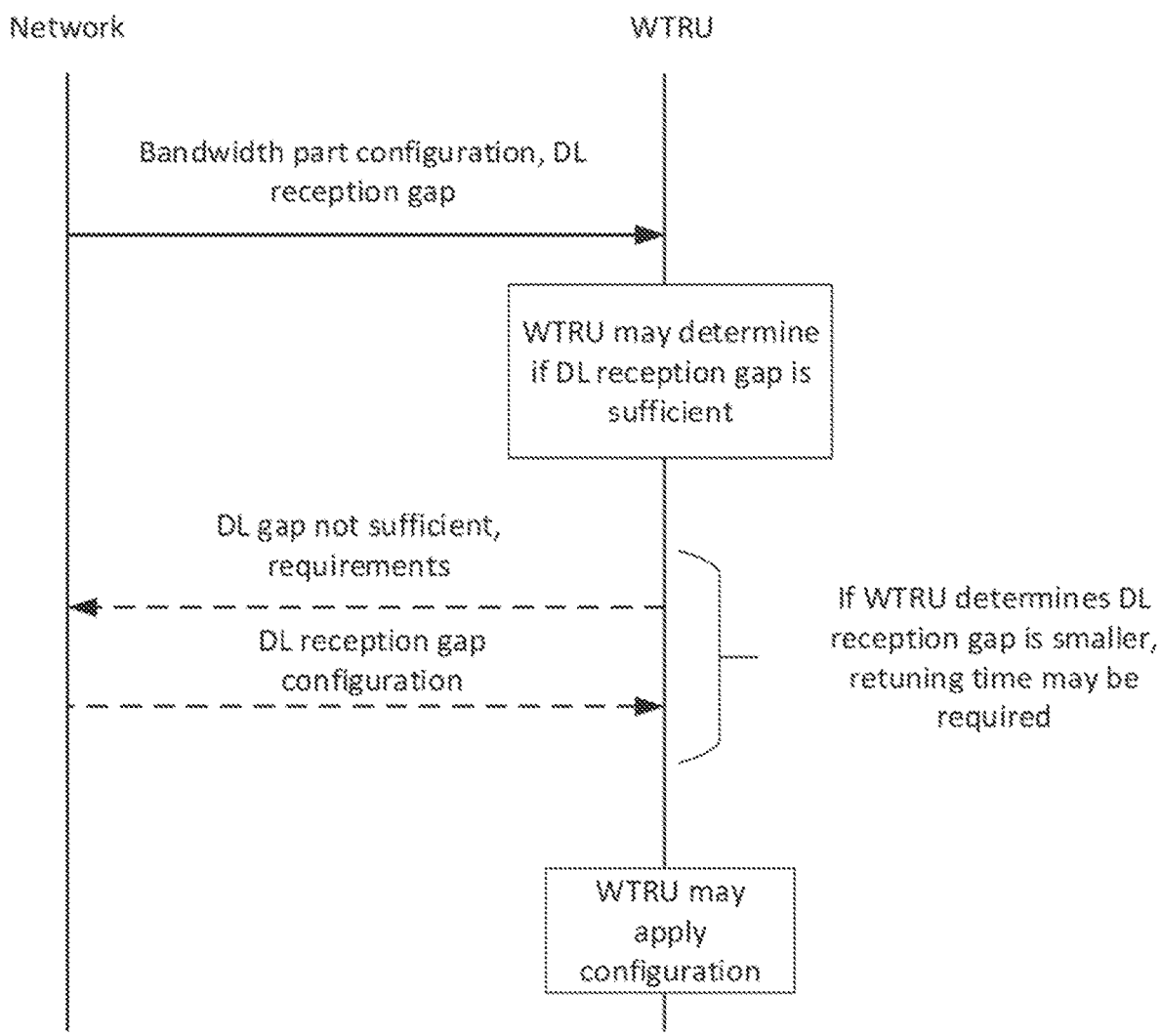
FIG. 11 is an example of a WTRU determining whether a DL reception gap may be sufficient.

FIG. 11 is an example of a WTRU determining whether a DL reception gap may be sufficient. A WTRU may be configured with a gap, and the WTRU may determine if the gap is sufficient. In examples, a network may configure a WTRU with an explicit DL reception gap (e.g., in addition to bandwidth configurations BW1 and BW2). A WTRU may be configured to determine, for example, whether its retuning time may be smaller than a DL reception gap. A WTRU may be configured to indicate to a network that a configuration may not be suitable/valid, for example, when a retuning time may not be smaller than a DL reception gap. The WTRU may indicate (e.g., further indicate) to a network a WTRU retuning time (e.g., required retuning time) for received bandwidth configurations.

Figure 12:
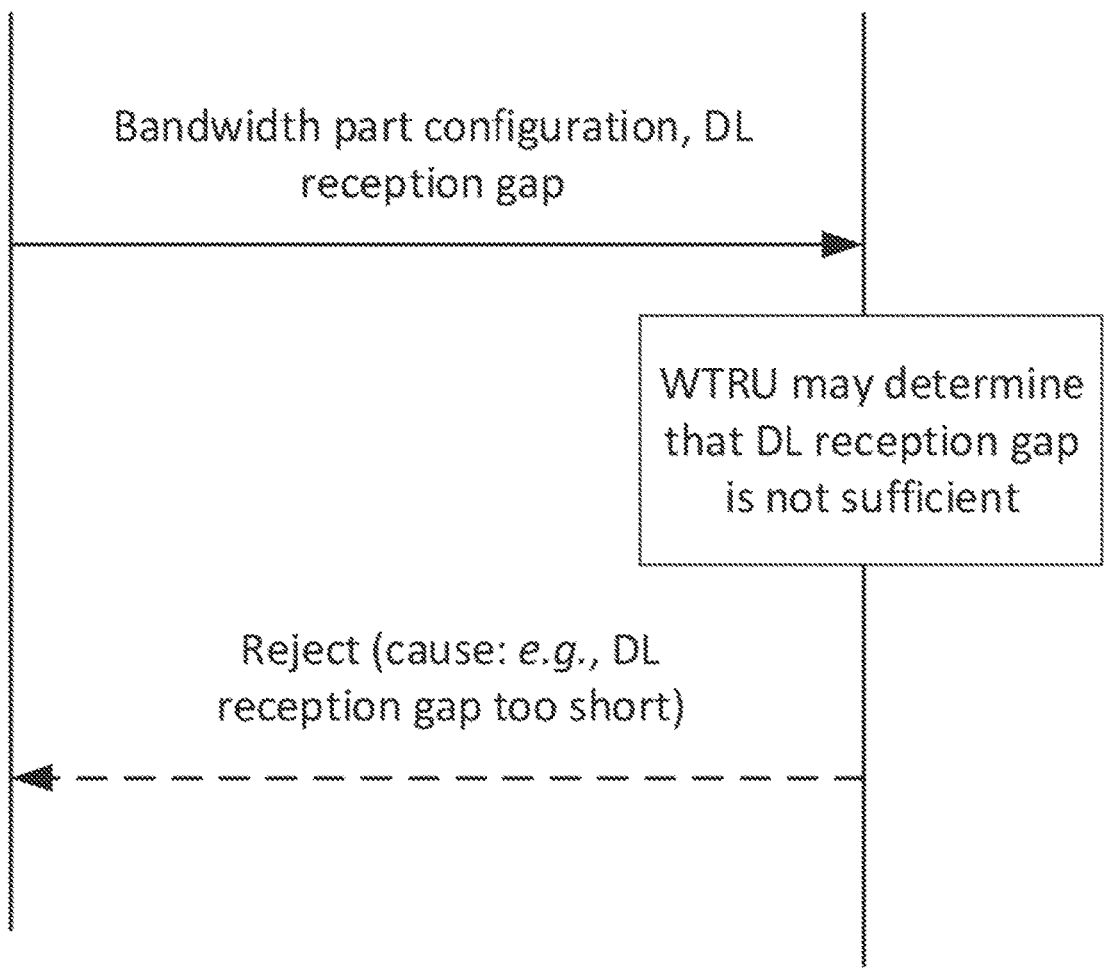
FIG. 12 is an example of a WTRU rejecting a configuration.

FIG. 12 is an example of a WTRU rejecting a configuration. In an example, a WTRU may be configured to reject a configuration, for example, when it may not be feasible (e.g., from a WTRU implementation perspective). A configuration may not be feasible, for example, when a bandwidth configuration may be improbable or impossible or a DL reception gap may be shorter than necessary for a WTRU. A WTRU may indicate (e.g., further indicate) a cause for rejection. For example, a cause for rejection may include a DL reception gap being too short or other reason.

A WTRU may report one or more receiver parameters. In examples (e.g., additional or alternative examples), a WTRU may indicate to a network a parameter that may be associated with its receiver, for example, to permit a network to determine (e.g., determine on its own) an appropriate DL reception gap for bandwidth configuration. A WTRU may provide or indicate information, such as a number of receiver chains that may cover a channel bandwidth, a retuning time when (e.g., only) bandwidth may be changed, and/or a retuning time when a center frequency may be changed. A WTRU may provide or indicate information, for example, as part of its capabilities configuration and/or upon configuration of bandwidth adaptation by a network.

A WTRU may be configured with a table of slot format(s) (e.g., instead of a gap). In examples, a WTRU may be configured with one or more slot format configurations (e.g., instead of a DL reception gap configuration). A (e.g., each) slot format configuration may (e.g., already) comprise a DL reception gap (e.g., with a defined duration). A slot format configuration may, for example, be pre-configured and/or indexed in a table.

A WTRU may report one or more (e.g., multiple) BWP configurations for a (e.g., each) pair and/or maximum retuning time. A WTRU may be configured to determine a (e.g., required or requested) retuning time (e.g., between every possible combination), for example, when the WTRU may be configured with more than two bandwidth part configurations or bandwidth configurations. A WTRU may report (e.g., explicitly report) to a network a retuning time that may be required or requested for a (e.g., each) combination. A WTRU may report a maximum or largest retuning time (e.g., largest retuning time required or requested) across one or more (e.g., all) combinations to a network. A WTRU may be configured to determine (e.g., determine first) a longest retuning time that may be required or requested between one or more (e.g., every possible) combination, for example, when a single DL reception gap is configured. A WTRU may (e.g., then) determine whether a DL reception gap may be long enough (e.g., is sufficiently long enough), for example, by comparing it to a longest retuning time (e.g., longest retuning time determined).

For one or more BWP configurations, autonomous transitions may be provided. A WTRU may be configured with two or more pairs of bandwidth parts, or one pair of bandwidth parts and one or more standalone bandwidth parts. For example, the WTRU may be configured with two bandwidth part pairs (e.g., $BWP_A$, $BWP_A'$) and (e.g., $BWP_B$, $BWP_B'$). The WTRU may be concerned with two types of gaps: intra-BWP-pair gap and inter-BWP-pair gap. The configuration described herein may be used, for example as follows. The WTRU may be configured to change (e.g., autonomously change) the WTRU's BWP within a BWP pair. The WTRU may be allowed to change BWP between different BWP pairs via explicit network indications.

In examples, the two BWPs in a BWP-pair may be configured in such a way that the WTRU may not retune (e.g., may not need to retune) its center frequency when changing from one BWP to the other (e.g., from $BWP_A$ to $BWP_A'$). The WTRU may utilize a short retuning time for intra-BWP-pair BWP changes. Energy may be saved if the WTRU is configured to change (e.g., autonomously change) between the BWP in the BWP-pair and have a short retuning time as described herein. For example, the WTRU may be configured such that $BWP_A$ has a wider BW than $BWP_A'$, and, in periods of inactivity, the WTRU may change its BWP to $BWP_A'$. Changes of BWP between different BWP-pairs may require longer retuning time (e.g., due to different center frequency) and may be used by the network to enable a radio resource management.

In examples, the WTRU may be configured to report the intra-BWP-pair retuning time and the inter-BWP-pair retuning time. For example, the WTRU may report the intra-BWP-pair retuning time and the inter-BWP-pair retuning time, e.g., separately. For example, the WTRU may report the intra-BWP-pair retuning time and the inter-BWP-pair retune time separately after configuration/re-configuration of the BWP-pairs by the network. In examples, the network may configure the WTRU with explicit association between BWP of the same pair. In examples, the WTRU may determine the pairs implicitly, for example based on center frequency.

In examples, the WTRU may report a retuning time (e.g., a required or requested retuning time) for intra-BWP-pairs and a retuning time (e.g., a required or requested retuning time) for inter-BWP-pairs. If the WTRU is configured with one or more (e.g., multiple) pairs, the WTRU may be configured to report the longest retuning time for each of the intra-BWP-pairs and inter-BWP-pairs. The WTRU may be configured to report the retuning time for a combination of pairs (e.g., or a subset of the combination of pairs), separately.

A WTRU configured for the pairs of BWPs, as described herein, may be configured to apply to a generalized set of BWPs. For example, the WTRU may be configured to be applicable to a set of BWPs (e.g., larger set of BWPs than the pairs of BWPs). The WTRU may be configured to be applicable to a case where a first set of more than one BWP is configured where one or more (e.g., all) BWPs in the set may share the same center frequency (e.g., or equivalently the WTRU may not retune its receiver to change from one BWP to the other within that BWP set). The set (e.g., having the same center frequency) may have similar characteristics as the BWP-pairs as described herein. For example, the intra-BWP-pair retuning time equivalent may be the intra-BWP-set retuning time, which may be the retuning time (e.g., required or requested retuning time) for BWP changes within the set. The inter-BWP-pair retuning time equivalent may be the inter-BWP-set retuning time, e.g., which may be the retuning time (e.g., required or requested retuning time) for BWP changes with the BWP outside of the set. The other BWP may belong to another set or may be a standalone BWP (e.g., with no associated set).

A WTRU may use a gap for intra-BWP pair and a gap (e.g., another gap) for inter-BWP-pair. In examples, the WTRU may be configured to use a gap (e.g., first time gap) when changing from one BWP to another BWP within the set (e.g., or pair), and another time gap (e.g., second time gap) when changing from one BWP to another BWP outside the set (e.g., or pair). The WTRU may determine the value of the gap from the network configuration or may indicate to the network at configuration time, using one or more of the approaches described herein.

A WTRU may indicate when retuning gap requirement cannot be met within a pair (e.g., or set). In examples, the WTRU may be configured with one or more BWP pairs or BWP sets. The WTRU may be configured with an intra-BWP-pair or intra-BWP-set retuning gap. The WTRU may be configured to determine whether the WTRU may perform a change of BWP within the pair or set within the delay budget imposed by the retuning gap. The WTRU may indicate to the network when the requirement cannot be met, for example via a RRC signaling of an error message. The WTRU may indicate (e.g., further indicate) the pair(s) or set(s) that may not be supported.

A receiver control resource set may be utilized by the WTRU. Multiple control resource sets may be provided per receiver bandwidth configuration. A WTRU may be configured with more than one control resource set to monitor. A control resource set may be associated to one or more configured receiver bandwidths.

A WTRU may be configured for each receiver bandwidth configuration (e.g., or slot format) with one or more control resource sets. When a specific receiver bandwidth is activated, the WTRU may be configured to monitor some or all the associated control resource sets. In examples, the WTRU may be configured with a first receiver bandwidth configuration with a single control resource set, and a second receiver bandwidth configuration with two (e.g., two adjacent sets, such as two sets adjacent in frequency) control resource sets, wherein one of the two adjacent control resource sets may correspond to the resource set associated to the first receiver bandwidth configuration.

A WTRU may be configured with a special control resource set (e.g., a default or a fallback). The WTRU may be configured to monitor this special control resource set, for example, regardless of the receiver bandwidth configuration. A WTRU may configure its receiver bandwidth to be able to receive (e.g., at least be able to receive) this special control resource set.

A WTRU may be configured with multiple control resource sets (for example, separately from the receiver bandwidth configuration), and may be configured to monitor the control resource sets that are contained in the receiver bandwidth currently active. A WTRU may be configured with control resource sets independently of the receiver bandwidth configuration. A WTRU may determine which control resources sets to monitor, for example, based on the receiver bandwidth and/or whether the receiver bandwidth contains the control resource set.

A WTRU may consider multiple adjacent or overlapping control resource sets as a single control resource set (e.g., by aggregation) when the WTRU has multiple adjacent or overlapping control resource sets to monitor. A WTRU may perform blind detection on this single control resource set block. In the case where aggregation would lead to different sets of blind decoding possibilities within the default or fallback set of resources, the WTRU may be configured to refrain from aggregating the default or fallback control resource set with other adjacent or overlapping control resource sets. A WTRU may perform blind decoding on the aggregate set of control resources. A WTRU may (e.g., may also) perform blind decoding on the default or fallback resources alone (e.g., not aggregate them). If a WTRU and network states are not synchronized, the foregoing approach may enable a robust fallback mechanism.

Scaling of the control resource set may be performed by the WTRU implicitly. A WTRU may be configured to implicitly determine the control resource set, for example, based on the configured receiver bandwidth.

A WTRU may be configured with different categories of receiver bandwidth configurations. For example, a WTRU may be configured with one "narrowband" and more than one "wideband" receiver bandwidth.

A WTRU may be configured for a specific control resource set associated to the narrowband receiver bandwidth configuration (e.g., the control resource set may comprise the entire narrowband receiver bandwidth configuration bandwidth).

A WTRU may be configured to determine the control resource set associated to a receiver bandwidth based on implicit rules. In an example, one or more configured parameters (e.g., scaling) may (e.g. may also) be used to determine the control resource set associated to a receiver bandwidth. A WTRU may be configured with a specific ratio for the control resource set to receiver bandwidth and an associated PRB offset with respect to the receiver bandwidth. A WTRU may determine the control resource set by applying the ratio to the active bandwidth and by applying the configured offset. In an example, this approach may be applicable to wideband receiver bandwidth configurations (e.g., not narrowband bandwidth configurations).

A change in receiver bandwidth may be triggered by one or more triggers. A system-wide change in receiver bandwidth may be implemented. An initial WTRU receiver bandwidth configuration may be based on initial access parameters.

A first WTRU receiver bandwidth may be indicated in system information. In examples, a first WTRU receiver bandwidth may be provided to the WTRU based on, for example, one or more parameters of a random access procedure. In examples, a WTRU may obtain a first receiver bandwidth based on, for example, a bandwidth (BW) used for transmission of a PRACH preamble or a bandwidth used for reception of a random access response. Receiver bandwidth may (e.g., may also) be tied to bandwidth used for transmission of synchronization signals or broadcast information.

Receiver bandwidth may change periodically and/or based on a schedule. A WTRU may be configured with a periodic change of receiver bandwidth. For example, a WTRU may be configured with an operational receiver bandwidth and a low power receiver bandwidth. A WTRU may be configured, for example, to use low power receiver bandwidth and retune (e.g., periodically retune) to use operational receiver bandwidth for a specific amount of time. Periodic changes in bandwidth may be implemented, for example, to enable the reception of large system-wide or broadcast/multicast messages (e.g., while limiting power consumption/receiver complexity at other times). Use of changes in bandwidth over time may (e.g., may also) be used for the WTRU to perform measurements (e.g., for mobility or radio resource management (RRM) purposes).

A network may configure a set of special time instants (e.g., slots, symbols, subframes, and/or the like) associated with configured periods where a WTRU may perform its re-tuning. A WTRU may not be expected to receive any downlink data during special time instants.

Receiver bandwidth may change, e.g., based on a system-wide signal (e.g., explicit signal). A WTRU may be configured to change its receiver bandwidth (for example from $BW_{LP}$ to $BW_{OP}$). For example, a WTRU may be configured to change its receiver bandwidth (e.g., from $BW_{LP}$ to $BW_{OP}$) upon reception of a predefined broadcast message or signal. This approach may enable a system to operate in a more active state where large amount of information may be transmitted to WTRUs in a cell. In examples, a signal may be a special PSS/SSS or a special indication in the master information block (MIB). In examples, a message may be carried by a DCI with a special radio network temporary identifier (RNTI) that may be common to more than one WTRU.

A WTRU may be configured with a receiver bandwidth configuration. For example, the WTRU may be configured with a first (e.g., or default) receiver bandwidth configuration. A message may carry (e.g., further carry) a schedule or a time during which a WTRU may maintain its new (e.g., second) receiver bandwidth configuration. The WTRU may be configured to change its receiver bandwidth back to a previous (e.g., first, or default) receiver bandwidth configuration and/or to a another (e.g., third) receiver bandwidth configuration (e.g., after the WTRU maintains its new (e.g., second) receiver bandwidth configuration during a schedule or a time). For example, the WTRU may be configured to return to a previous bandwidth configuration after a period time has elapsed (e.g., since the bandwidth configuration was changed) and/or after a period of inactivity (e.g., a length of time since a last transmission activity).

A change in receiver bandwidth may be WTRU-specific. A change in WTRU receiver bandwidth may be triggered, for example, by a downlink indication, e.g., in a DCI. In an example, a DCI may include an explicit field or indication for change of receiver bandwidth (e.g., explicit DCI). In examples, a DCI may include a normal data allocation (e.g., implicit DCI). The DCI may be received on a dedicated PDCCH or, for example, on a group-PDCCH.

A WTRU may be configured to receive and/or determine an explicitly indicated change of receiver bandwidth, for example based on group-PDCCH and/or wake-up signal. A WTRU may be configured to change its receiver bandwidth based on the reception of an explicit indication received on the PDCCH or group-PDCCH (e.g., in the DCI). A WTRU may determine the new receiver bandwidth based on the indication. For example, a WTRU may be configured with multiple receiver bandwidths that are associated with a respective index value (for example 0, 1, 2, and 3 in the case of 4 receiver bandwidth configurations). A WTRU, upon reception of the index, may configure its receiver according to the associated configuration. An indication may include a single bit and may indicate a bandwidth configuration. For example, an indication may include a single bit and may indicate one of two receiver bandwidth configurations (e.g., narrow or wide). An indication may be interpreted as a wake-up message.

A WTRU may be configured to change its receiver bandwidth (for example to a second configuration, or a wider bandwidth), e.g., based on reception of its ID (e.g., or RNTI) on the PDCCH or its group-ID (e.g., or group-RNTI) on the group-PDCCH.

A change in receiver bandwidth may be based on DCI content (e.g., out of bandwidth allocation). In examples, a WTRU may be configured to change its receiver bandwidth implicitly (e.g., based on the content of a DCI or implicit DCI). In examples, a WTRU may be configured to change its receiver bandwidth, for example, when resources allocated in a DCI for DL data reception are outside current receiver bandwidth. A WTRU may change its receiver bandwidth, for example, to receive scheduled data, such as in the current slot (e.g., which may lead to not receiving the first few symbols) or in a subsequent (e.g., next) slot.

In examples, a WTRU may be configured to change receiver bandwidth based on a received DCI, for example when a downlink data allocation is outside current receiver bandwidth and the received DCI indicates that the allocation may be valid for a longer period than the current slot. In examples, a DCI may indicate that the allocation is valid for: the current and next slot, or for the next slot (e.g., only for the next slot), or for a number of upcoming slots, etc. A WTRU may (e.g., alternatively) be configured to not receive or attempt to receive a downlink allocation in a current slot. For example, a downlink allocation may not be transmitted by a base station due to retuning. This approach may (e.g., from an overhead point-of-view) require a single DCI (e.g., only a single DCI) to signal a change in WTRU receiver bandwidth and signal a data allocation. This approach may support ensuring that a WTRU and network may be (e.g., are) synchronized with respect to WTRU receiver bandwidth. In examples, a WTRU may be configured to transmit a NACK, for example, when a received DL allocation on a DCI is outside receiver bandwidth. A DCI may indicate that the allocation is valid for the current slot (e.g., only the current slop).

In examples, a WTRU may change (e.g., implicitly change) its receiver bandwidth upon reception of a DCI with an uplink data allocation. This may be implemented, for example, based on an observation that WTRU downlink data activity may be correlated to WTRU uplink data activity (e.g., TCP ACK/NACK).

A change in receiver bandwidth (e.g., from reduced low power $BW_{LP}$ to nominal $BW_{OP}$) may occur, for example, when a WTRU moves into a more active state of data activity.

A WTRU may change (e.g., autonomously change) its receiver bandwidth to a larger operational bandwidth, for example, based on uplink data activity. In examples, a WTRU may be configured to autonomously increase its receiver bandwidth based on uplink data activity, e.g., based on one or more triggers, such as one or more of the following: (i) new data in a UL buffer or a total amount above a threshold (e.g., which may be configurable); (ii) new data becomes available for transmissions in the UL buffer for a radio bearer with a specific QoS guarantee or the initial configuration thereof (e.g., a guaranteed bit rate may need more schedulable resources than a currently available data rate); (iii) a Scheduling Request (SR) is triggered or pending or a transmission associated with the SR is performed; (iv) WTRU triggers transmission of buffer status report (BSR), for example, when a reported amount is above a certain (e.g., configurable) threshold (e.g., for one or more applicable radio bearers); (v) WTRU transmits PRACH, for example, when RACH may be for a scheduling request and/or BSR reporting; (vi) WTRU transits away from a low power state (e.g., out of discontinuous reception (DRX) Inactive Time, such as when a WTRU moves out of a low power/DRX state); and/or (vii) WTRU changes RRC state (e.g., from Idle/Inactive to Connected or similar).

A change in receiver bandwidth (e.g., time when a WTRU retunes its RF) may occur before or after a triggering event, which may depend on the event. For example, a WTRU may be configured to autonomously change its receiver bandwidth before transmitting a BSR.

A WTRU may be configured to (e.g., autonomously) change its receiver bandwidth (e.g., from an operational value such as $BW_{OP}$ to a smaller value such as $BW_{LP}$) based on (e.g., after a certain period of) inactivity. In examples, a WTRU may be configured with an inactivity timer $T_{BW}$. A WTRU may be configured to change its receiver bandwidth (e.g., reduce to $BW_{LP}$), for example, upon expiration of an inactivity timer $T_{BW}$. In examples, an inactivity timer may be the same timer as another inactivity timer (e.g., for DRX). In examples, a WTRU may be configured to autonomously change its receiver bandwidth (e.g., to a smaller value) after a configured number of DRX cycles. For example, an inactivity timer may be interpreted as an integer number of DRX cycles.

A WTRU may (e.g., alternatively) be configured to autonomously change (e.g., reduce) its receiver bandwidth, for example, when moving to a lower RRC state of activity (e.g., moving from RRC Connected to RRC Idle or other state).

A WTRU may (e.g., alternatively) be configured to transmit a request to change (e.g., reduce) receiver bandwidth or an activity indication (e.g., low activity indication) to a network. The request/indication may be, for example, a physical layer message or a buffer indication message (e.g., BSR with 0 bits in buffer) or an RRC message.

A WTRU may be configured to change (e.g., reduce) its receiver bandwidth explicitly, for example using a control message from a network (e.g., DCI, MAC control message, RRC, or even from higher layers).

A WTRU may be configured to change (e.g., reduce) its receiver bandwidth, for example, upon determination that the WTRU may no longer have a valid uplink timing synchronization with the system (e.g., the WTRU may determine that the uplink timing advance is no longer valid). A WTRU may be configured to change (e.g., reduce) its receiver bandwidth, for example, upon determination that it may enter a low power state (e.g., DRX Inactive time, transition to RRC IDLE, transition to RRC Inactive state, and/or the like).

A WTRU may be configured to change (e.g., reduce) its receiver bandwidth and may revert to a default bandwidth configuration (e.g., a bandwidth applicable to initial access to a system), for example, when the WTRU determines that an error condition may have occurred. For example, an error condition may correspond to one or more of the following: insufficient radio channel quality (e.g., for a specific control channel), a radio link problem, a radio link failure, a loss of uplink synchronization, loss of downlink synchronization, initiation of a procedure such as a connection re-establishment procedure and/or determination that the WTRU is power-limited and/or reporting thereof, and/or the like.

A WTRU may receive an indication to change (e.g., reduce) its receiver bandwidth. For example, a WTRU may be scheduled with a burst of transmissions. A WTRU may (e.g., upon transmission of the last TB in the burst) receive an indication (for example in a protocol data unit header (e.g., MAC or other) or via the associated DCI) to revert to a different (e.g., smaller) receiver bandwidth for future control channel monitoring. The WTRU may acknowledge (e.g., implicitly acknowledge) this, for example, by transmitting an ACK for the last transmission. A retransmission of the last TB may be over the larger bandwidth. The changed (e.g., reduced) bandwidth may take effect after the last retransmission. A network may indicate an appropriate center frequency for an upcoming modified (e.g., reduced) receiver bandwidth. This may enable the network to properly balance its load.

A WTRU may change its receiver bandwidth to a smaller value (e.g., from $BW_{OP}$ to $BW_{LP}$) after a certain period of inactivity and/or based on an activity level. A receiver bandwidth may be referred to as a bandwidth part or DL bandwidth part, and a low power (or low activity) bandwidth may be referred to as a default bandwidth part or default DL bandwidth part. The receiver bandwidth used by the WTRU at a given point in time may be referred to as an active bandwidth part. A time when the WTRU may make a determination of an active bandwidth part may be a slot, mini-slot, subframe, and/or NR-UNIT. The determination of an active bandwidth part may take place for the Active Time defined by the DRX procedure or for a slot, mini-slot, and/or subframe in which a WTRU has a configured DL assignment or UL grant. When the WTRU makes a determination to set its active bandwidth part to a first bandwidth part different from a second bandwidth part (e.g., which may be currently active bandwidth part), the second bandwidth part may be deactivated and the first bandwidth part may be activated.

A WTRU may make a determination to set its active bandwidth part to a specific bandwidth part (e.g., a default bandwidth part) based on whether at least one timer used as part of DRX operation is running or not. The timer(s) may include one or more of the following examples: drx-InactivityTimer; drx-RetransmissionTimerDL defined for a (e.g., each) DL HARQ process; drx-HARQ-RTT-TimerDL defined for a (e.g., each) DL HARQ process; drx-RetransmissionTimerUL defined for a (e.g., each) UL HARQ process; drx-HARQ-RTT-TimerUL defined for a (e.g., each) UL HARQ process; drxShortCycleTimer; onDurationTimer; and/or mac-ContentionResolutionTimer.

In examples, the WTRU may determine that an active bandwidth part may be set to a specific bandwidth part (e.g., a default bandwidth part) in case one or more of the following set of conditions occur: when drx-InactivityTimer has expired; when drx-RetransmissionTimerDL and/or drx-RetransmissionTimerUL has expired for one or more (e.g., all) HARQ processes; and/or when drx-HARQ-RTT-TimerDL and/or drx-HARQ-RTT-TimerUL has expired for one or more (e.g., all) HARQ processes.

Setting an active bandwidth part to a specific (e.g., default) bandwidth part based on one or more conditions may ensure that the WTRU changes (e.g., only changes) its active bandwidth part to a default bandwidth part after a minimum time since the last new transmission and/or when no HARQ retransmission is to be expected.

One or more of the following criteria may be added to the one or more conditions described herein such that the WTRU is in Active Time: onDurationTimer may be running or mac-ContentionResolutionTimer may be running; a Scheduling Request may be sent on PUCCH and may be pending; and/or an uplink grant for a pending HARQ retransmission may occur and there may be data in the corresponding HARQ buffer; and/or a PDCCH indicating a new transmission addressed to the C-RNTI of the MAC entity may not have been received after successful reception of a Random Access Response for the preamble not selected by the MAC entity.

In examples, the WTRU may determine that an active bandwidth part may be set to a specific (e.g., a default) bandwidth part when (e.g., only) the onDurationTimer (e.g., and/or mac-ContentionResolutionTimer and/or drxShortCycleTimer) is running (e.g., among timers utilized for DRX operation).

A short DRX cycle may be configured. When a short DRX cycle is configured, the WTRU may use a short DRX cycle upon reception of a DRX Command MAC control element or upon expiry of drx-InactivityTimer or until drxShortCycleTimer expires. The WTRU may use a long DRX cycle upon expiry of drxShortCycleTimer or upon reception of a Long DRX Command MAC control element or upon reception of a DRX Command MAC control element if the short DRX cycle is not configured.

In examples, the WTRU may determine that an active bandwidth part may be set to a default bandwidth part if the WTRU uses the long DRX cycle according to at least one of the set of conditions described herein. For example, the WTRU may determine that an active bandwidth part may be set to a default bandwidth part upon reception of a Long DRX Command MAC control element, or upon reception of a DRX Command MAC control element if short DRX cycle is not configured, or if drxShortCycleTimer has expired and other timers are not running (e.g., as described herein).

In examples, the WTRU may be configured with a bandwidth part applicable when the WTRU uses the short DRX cycle, or when drxShortCycleTimer is running. Such bandwidth part may be referred to as a short DRX bandwidth part. A short DRX bandwidth part may have a bandwidth larger than a default bandwidth part applicable when the WTRU uses the long DRX cycle, but smaller than the bandwidth part used when there is activity (e.g., when drx-InactivityTimer is running). The set of conditions to set the active bandwidth part to the short DRX bandwidth part may include one or more sets of conditions for setting the active bandwidth part to a default bandwidth part as described herein and/or with the additional condition that drxShortCycleTimer is running.

A WTRU may no longer be active in transmissions (e.g., HARQ-based transmissions).

For example, the WTRU may determine that an active bandwidth part may be set to a first bandwidth part (e.g., a default BWP) if one or more (e.g., all) HARQ processes applicable to a second bandwidth part are or become inactive. For example, one or more (e.g., all) HARQ process may be completed successfully (e.g., the last feedback received or assumed for the concerned HARQ processes is ACK, and/or the concerned HARQ processes are suspended, and/or the concerned HARQ processes have not been addressed by scheduling information with a given period of time since last time the process has been active with a transmission). This may be combined with the condition that the drx-InactivityTimer is not running (e.g., or has expired), if DRX is configured (e.g., the WTRU may set the active bandwidth part to a first bandwidth part based on the HARQ process(es) associated with a second bandwidth part being inactive and based on the drx-InactivityTime being expired or not running). If the HARQ process(es) associated with a second bandwidth part are active or the drx-InactivityTime is running, the WTRU may determine that an active bandwidth part may be set to a second bandwidth part (e.g., a BWP of the WTRU's configuration) and/or a set thereof.

A WTRU may have no data available for transmission of the concerned BWP(s).

For example, the WTRU may determine that an active bandwidth part may be set to a first (e.g., uplink) bandwidth part (e.g., a default BWP), if the WTRU has no data available for transmission in its buffer (e.g., a subset of the WTRU's configured logical channel(s) (LCH(s))). For example, the WTRU may determine to use a default BWP if the WTRU has no data available for transmission for a LCH corresponding to a specific QoS (e.g., URLLC) and/or when the WTRU is configured with at least one BWP corresponding to the concerned QoS (e.g., a specific numerology and/or TTI duration with a given reliability). The WTRU may be configured with information that enables the WTRU to associate (e.g., or map) a LCH with a given BWP for each LCH such that the WTRU may determine whether or not a LCH may be included in such determination. Such information may include one or more parameters related to the physical layer transmission characteristics such as one or more TTI durations, numerology(ies), and/or the likes. Such parameters may correspond to a configured mapping between a subset of transmissions such as a transmission profile and/or a set of transmission parameters. In examples, the WTRU may perform such determination after a specific (e.g., possibly configured) amount of time. Such time may correspond to the time that has elapsed since the transmission of a transport block (e.g., that included the data leading to the determination that there is no data let for transmission). In examples, this time may correspond to the completion of the HARQ process associated to such transport block (e.g., such as described herein). In examples, this may be combined with the condition that the drx-InactivityTimer is not running (e.g., or has expired), if DRX is configured. In examples, this may be combined with the condition that the timingAlignmentTimer is not running (or has expired), if DRX is configured. In examples, this may be in combination with the condition that the WTRU is configured with the short DRX cycle and the WTRU is using the long dRX cycle, if DRX is configured. If the DRX is not configured, the WTRU may determine that an active bandwidth part may be set to a second bandwidth part (e.g., a BWP of the WTRU's configuration) and/or a set thereof.

A WTRU may configured to be no longer addressable on the concerned BWP(s).

For example, the WTRU may determine that an active bandwidth part may be set to a first bandwidth part (e.g., a default BWP) if the WTRU determine an impairment for the currently active, second bandwidth part (e.g., of the WTRU's configuration). Such impairment may include beam failure, beam management failure, reaching the maximum number of uplink transmission (e.g., for an UL BWP), determination of radio link problem (e.g., based on reaching a number of out-of-synch indication received from the lower layers), determination of Radio Link Failure, and/or the WTRU initiating a RRC Connection re-establishment procedure.

A WTRU may change its receiver bandwidth based on the reception of a paging indication/paging message from the TRP. A WTRU may be configured with a first receiver bandwidth associated to reception of a paging indication. A paging indication may, for example, comprise a pre-determined sequence and/or may contain a message (e.g., a paging message). A WTRU may be configured with a second receiver bandwidth associated to reception of further control information or data assignment following the paging indication.

A WTRU may be configured to operate with the first receiver bandwidth when monitoring the paging channel for a potential paging occasion. A WTRU may be configured to change its receiver bandwidth to the second receiver bandwidth configured, e.g., upon successful reception of a paging indication carrying an identity or a sequence associated to the WTRU (e.g., international mobile subscriber identity (IMSI), a function of IMSI, a pre-configured sequence, or other identity).

A WTRU may reconfigure its receiver bandwidth to the first receiver bandwidth after a timer expires. For example, the timer may be started when the WTRU initially configures the first receiver bandwidth. The timer may be reset if the WTRU receives a further change of bandwidth indication while the timer is running. The timer value used may be specific to each receiver bandwidth or may be common across multiple receiver bandwidths. The WTRU may reconfigure its receiver bandwidth to the first receiver bandwidth, e.g., upon reaching the next paging occasion. The WTRU may reconfigure its receiver bandwidth to the first receiver bandwidth if the WTRU goes to IDLE mode. A WTRU may be configured to use the first receiver bandwidth, for example, when entering an extended DRX period in IDLE mode. A WTRU may be configured to change its receiver bandwidth to the second receiver bandwidth upon exiting an extended DRX period in IDLE mode.

A WTRU may change its receiver bandwidth based on change of DRX cycle and/or activation status. A WTRU may be configured to change its receiver bandwidth based on the WTRU DRX status. A WTRU may be configured to change its receiver bandwidth (e.g., to a predefined configuration) when the WTRU enters/exits a DRX State. Such DRX State may be, for example, one or more of the following: DRX Active Time, DRX Long Cycle, DRX Short Cycle, and/or the like.

A WTRU may be configured with a receiver bandwidth configuration (e.g., which may include control resource set(s)) for each state.

A WTRU may be configured with a bandwidth adaptation activation status controlled by the network (e.g., via MAC control element (CE)/L3 RRC or other mechanism). The WTRU may be configured with a receiver bandwidth configuration when the bandwidth adaptation activation status is disabled. The WTRU may be configured with one or more receiver bandwidth configurations to apply when the bandwidth adaptation activation status is enabled. The WTRU may determine which configuration to apply in such case (for example, based on the DRX Status).

A WTRU may be configured to disable bandwidth adaptation status upon deactivation of DRX. The WTRU may be configured to require a separate activation indication (e.g., from DRX activation indication) for bandwidth adaptation activation.

A synchronized state may be maintained between a WTRU and a network (NW), e.g., both entities may be in-sync with respect to the state of the WTRU receiver bandwidth, which may enable the network and WTRU to take full advantage of radio resources. It may be desirable to limit state synchronization errors. Example synchronization error cases may be considered.

In examples, a network may assume that WTRU receiver bandwidth is $BW_{OP}$ (e.g., operation bandwidth), while WTRU receiver bandwidth is $BW_{LP}$ (e.g., low power receiver bandwidth). This error may result, for example, in a WTRU not receiving a downlink assignment, which may delay delivery with network performing retransmission.

In examples, a network may assume that WTRU receiver bandwidth is $BW_{LP}$ while WTRU receiver bandwidth is $BW_{OP}$. This error may result in, for example, one or more of the following: (i) added delays for network transmission of a receiver bandwidth change indication before transmitting data; (ii) a missed downlink transmission (e.g., when WTRU search space (e.g., including DCI formats) may be different when configured with $BW_{LP}$ versus $BW_{OP}$); and/or (iii) unnecessarily reduced transmission rate (e.g., when network may be using a small bandwidth (e.g., $BW_{LP}$) for data transmission).

Figure 13:
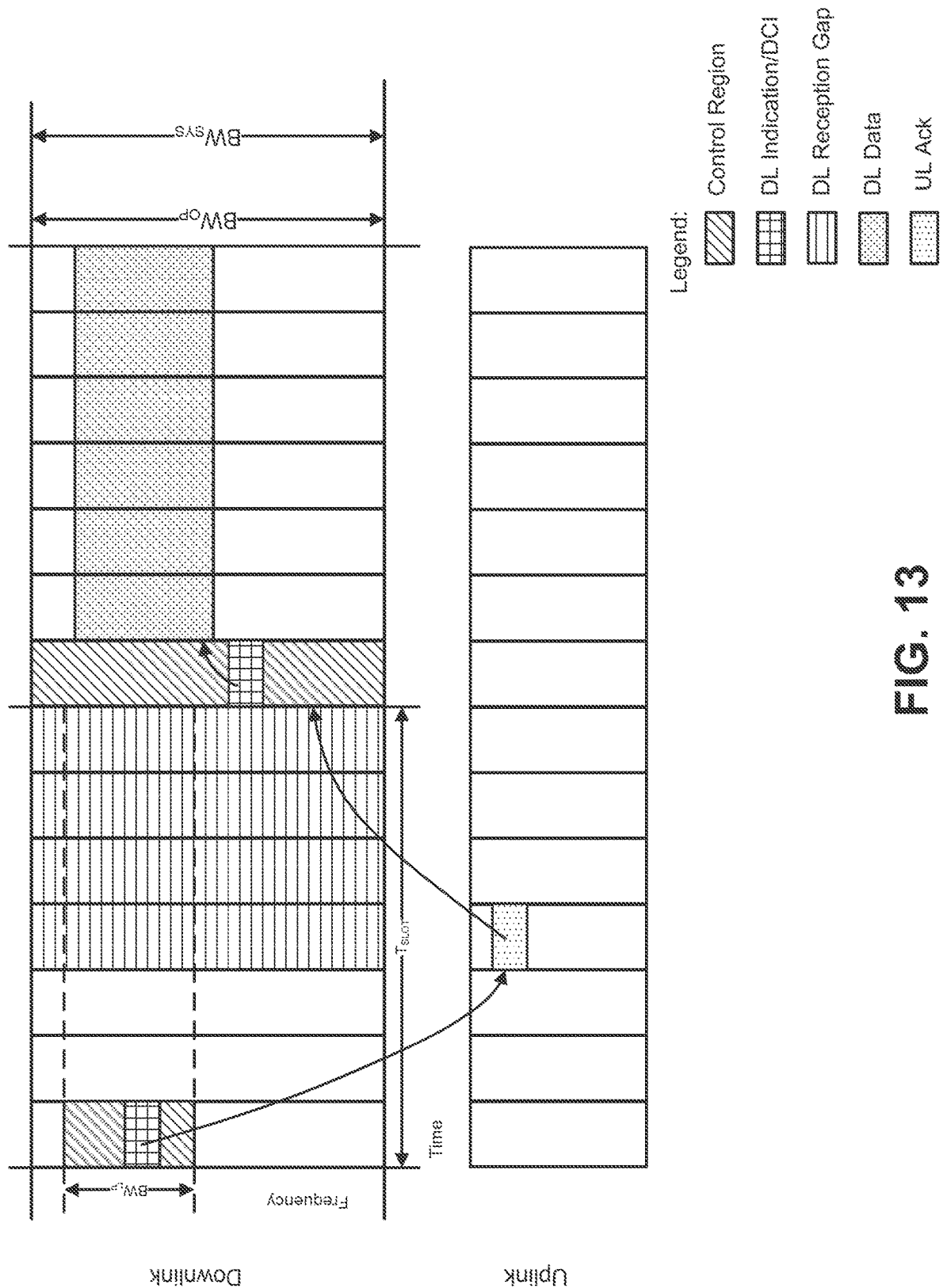
FIG. 13 is an example control channel bandwidth change with ACK.

FIG. 13 is an example control channel bandwidth change with ACK. A WTRU may transmit an acknowledgment control message, for example, when receiving a change of receiver bandwidth request. This may be implemented, for example, based on WTRU acknowledgement of the change of receiver bandwidth request by the network. A WTRU may transmit an ACK message (e.g., on a physical uplink control channel such as PUCCH) at a known time/location, e.g., following successful reception of a DL Indication leading to a change of receiver bandwidth. An uplink ACK may indicate to a network that receiver bandwidth may have been changed. A network may use WTRU operational bandwidth for data transmission.

In examples, a WTRU may be configured to transmit an acknowledgement. For example, a WTRU may be configured to transmit an acknowledgement (e.g., explicit acknowledgement) when no other form of acknowledgement are to be transmitted (e.g., CQI or other). For example, the WTRU may be configured to transmit an acknowledgement (e.g., explicit acknowledgement) when the change of bandwidth is triggered by an explicit DCI (e.g., a DCI with an explicit change of bandwidth indication). An implicit DCI may include a data allocation and may be configured to signal ACK/NACK by the WTRU. The presence of the ACK/NACK may be used by the network to acknowledge the change of bandwidth (e.g., an explicit ACK for the change of bandwidth may not be necessary for an implicit DCI). In examples, the WTRU may be configured to transmit the acknowledgement in the associated PUCCH resources (e.g., based on a normal association rules). In examples, one or more special resources may be reserved for such transmission of the acknowledgement.

Figure 14:
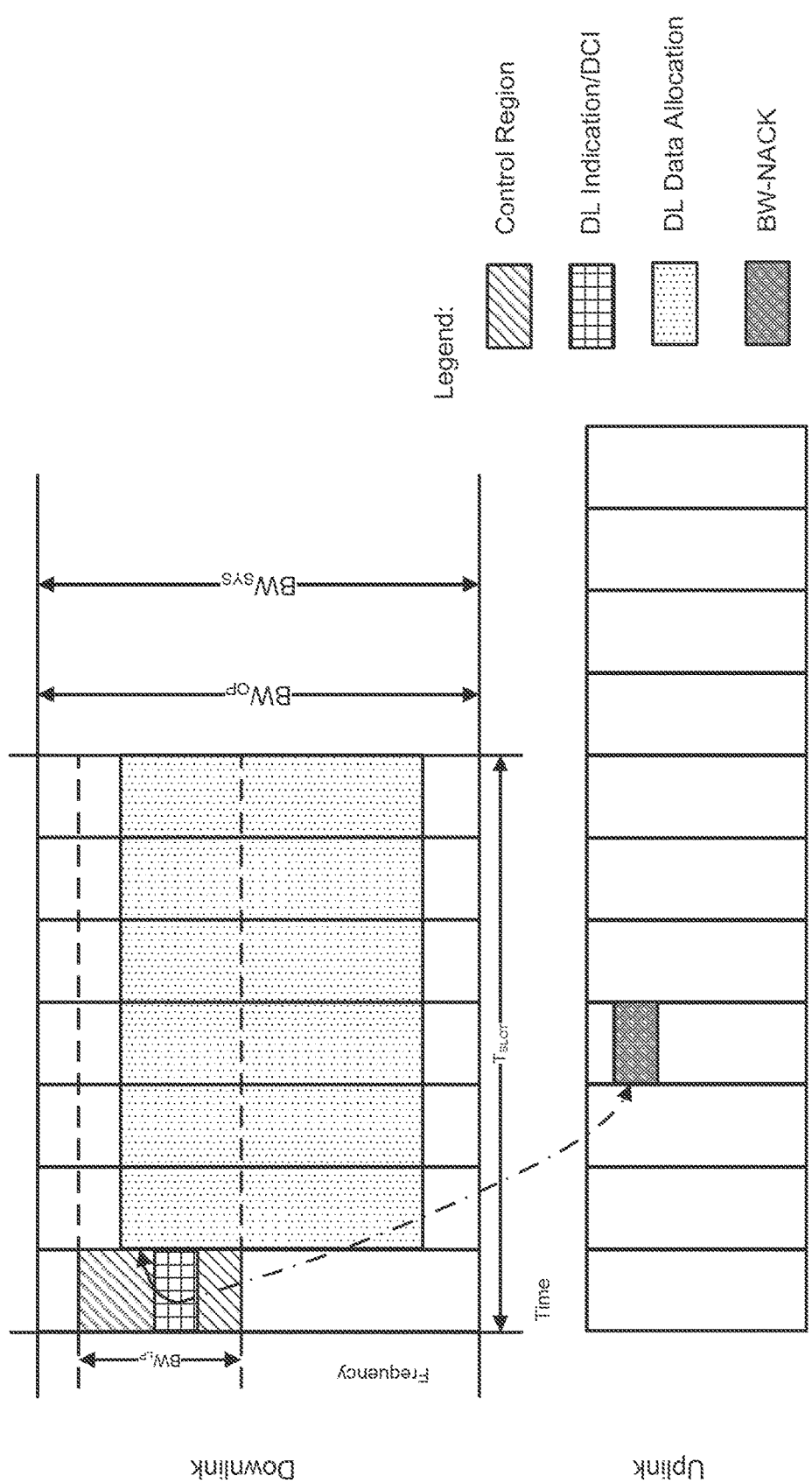
FIG. 14 is an example transmission of NACK when DCI allocation is outside receiver bandwidth.

FIG. 14 is an example transmission of NACK when DCI allocation is outside receiver bandwidth. In examples, a WTRU may be configured to transmit a negative acknowledgement message (NACK), for example, when the WTRU receives a DCI for which the DL allocation may be (e.g., is) outside the WTRU current receiver bandwidth. A WTRU may not be able to receive the data. The WTRU may transmit a special NACK signal, which may be different than a normal HARQ-ACK message (e.g., different time or location). For example, a special NACK signal (e.g., BW-NACK) may be transmitted before a normal HARQ-ACK message.

A WTRU may (e.g., alternatively) use a normal HARQ-ACK mechanism and resource to transmit a BW-NACK, which may be transmitted as a normal NACK message.

A WTRU may change (e.g., autonomously change) its receiver bandwidth to the operational bandwidth ($BW_{OP}$) for subsequent (following slots), for example, upon reception of a DCI for which DL allocation may be outside current WTRU receiver bandwidth. This may be implemented, for example, when a network may retransmit NACKed data and may not be able to determine a reason for the transmission failure. For example, a network may not know that a transmission failed due to WTRU receiver bandwidth (e.g., as opposed to a failure due to channel errors).

Figure 15:
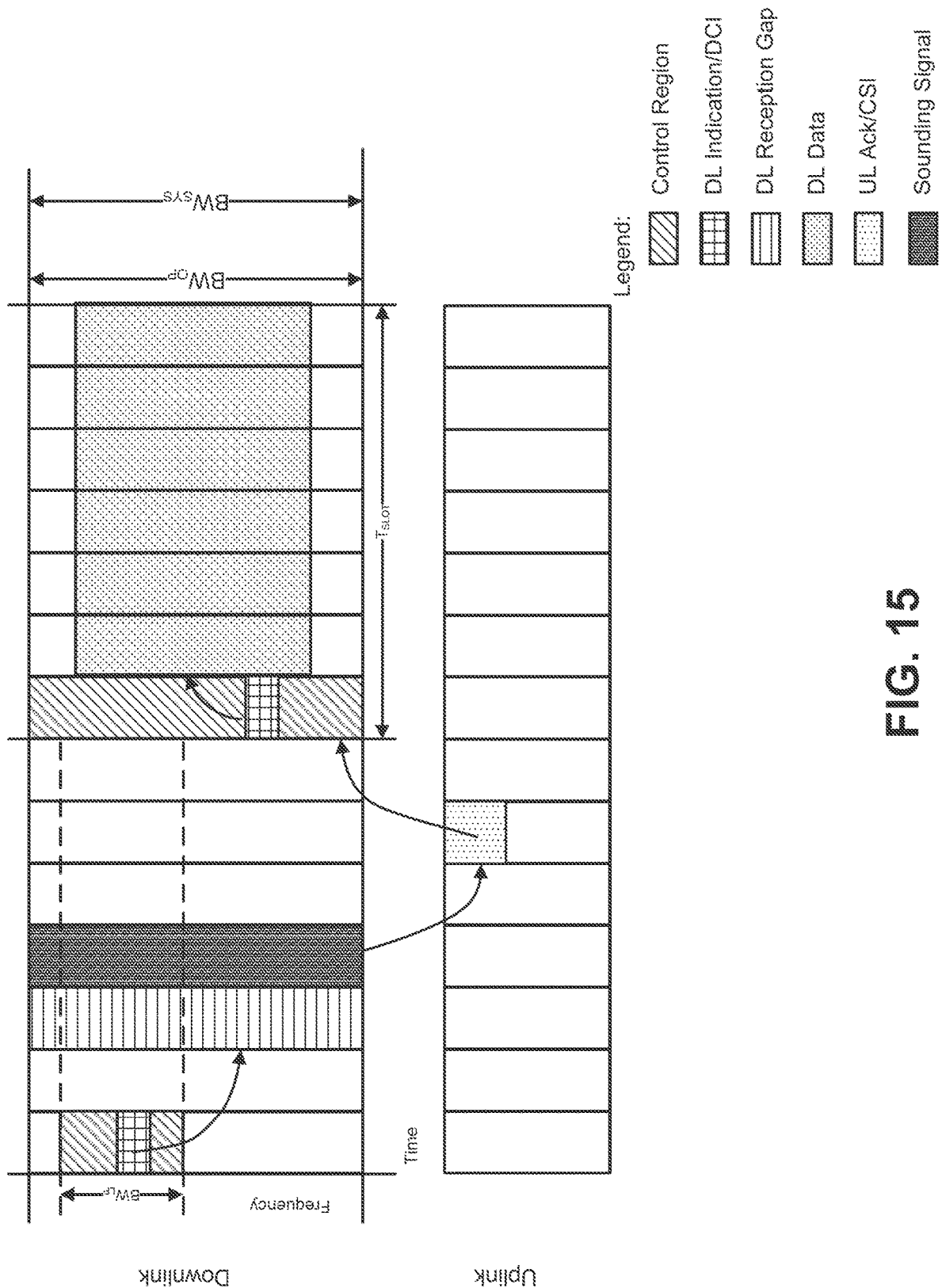
FIG. 15 is an example control channel bandwidth change with channel quality indicator (CQI) as ACK.

FIG. 15 is an example control channel bandwidth change with CQI as Ack. A WTRU may acknowledge (e.g., implicitly acknowledge) a network with a change of receiver bandwidth. CSI may be used as an implicit receiver bandwidth change acknowledgement. A WTRU may use transmission of CSI information as a receiver bandwidth change acknowledgement. For example, a WTRU may receive a first downlink indication, indicating a WTRU should change its receiver bandwidth. Upon or after changing its receiver bandwidth, the WTRU may determine and may measure an associated DL sounding signal. Associated DL sounding signal parameters may be pre-configured and/or may depend on DCI content and/or characteristics. The WTRU may transmit CSI information on a resource that may be known by the network. A resource may be determined from DCI content and/or parameters. The network may (e.g., upon reception of CSI information) determine that the WTRU changed its receiver bandwidth and may initiate downlink transmission with appropriate CSI information.

CSI information may include information related to the beam, channel CQI, rank, pre-coding information, and/or the like. A WTRU may be configured to transmit in response multiple CQIs, for example, when the WTRU receives multiple sounding signals (e.g., from multiple TRPs). In examples, a WTRU may select a subset of TRP to respond based on, for example, sounding signal strength/quality and/or configuration (e.g., based on TRP IDs).

CSI information may be accompanied by an acknowledgement (ACK) message. This may improve reception errors or may acknowledge a change of receiver bandwidth (e.g., to other TRPs that may not be able to receive or may be configured to decode the CSI information).

A control channel region may depend on configured receiver bandwidth. A WTRU may determine the control region based on its receiver bandwidth. In examples, a set of time/frequency physical radio resources used for control channel reception may change, for example, depending on a receiver bandwidth configuration. A WTRU may be configured with a set of control channel resources when operating with $BW_{LP}$ and a separate set of control channel resources when operating with $BW_{OP}$. The resources may be configured (e.g., configured independently) from each other or (e.g., alternatively) there may be a relationship. For example, a control channel region or resources associated with $BW_{LP}$ may be included in resources associated with $BW_{OP}$. In examples, a rule (e.g., implemented using a set of reference configuration tables or a set of formulas) may associate time/frequency resources for control channel resources with WTRU receiver bandwidth.

A WTRU may (e.g., alternatively) be configured with a first control channel region and a second control channel region. A first control channel region may be used, for example, for any WTRU receiver bandwidth (e.g., $BW_{LP}$ or $BW_{OP}$). A second control channel region may be reserved, such as for when WTRU receiver bandwidth is $BW_{OP}$ (e.g., operating bandwidth). This may permit a network to send a DCI to the WTRU on the first control channel region regardless of WTRU state (e.g., it can be used to recover WTRU state). A WTRU may be configured to monitor (e.g., always monitor) the first control channel region (e.g., at least the first control channel region).

A WTRU may (e.g., alternatively) be configured with a single control channel region, which may be used (e.g., always be used) regardless of receiver bandwidth. This control channel region may be limited to a bandwidth $BW_{LP}$.

A reduced control channel region resource pattern may be provided. In examples, a WTRU may be configured with a control channel region that may hop frequency (e.g., in a semi-static configured pattern). A hopping pattern may be configured to avoid colliding with a pattern associated with other services, such as eMTC, for example.

A hopping pattern may be (e.g., only) applied, for example, when a WTRU is using a reduced receiver bandwidth ($BW_{LP}$). A hopping pattern may not be configured when a WTRU is using an operational bandwidth ($BW_{OP}$).

A control channel region hopping pattern may be defined for multiple receiver bandwidths. For example, a control channel region hopping pattern may be independently defined for each of a plurality of receiver bandwidth (e.g., both $BW_{LP}$ and $BW_{OP}$).

A WTRU may be configured with a default or fallback control resource set that it monitors. The control resource set may be associated to a specific set of PRBs and a set instances/periods of time. Time instances may be periodic with a specific configuration. Time instances may be associated to a DRX cycle, an Active Time, and/or the like. A WTRU may be configured with a fallback control resource set that it monitors periodically at the Active Time during a DRX cycle.

Configuration with a default or fallback control resource set may enable the network to be able to communicate with the WTRU, for example, if the WTRU and network are not synchronized with respect to the WTRU receiver bandwidth configuration. For example, if the WTRU has not received a change of receiver bandwidth configuration indication, the network may attempt to schedule the WTRU via a control resource set that may not be monitored by the WTRU. The network may issue another command in the known fallback control resource set at the next opportunity.

A WTRU may (e.g., upon a change in receiver bandwidth) be configured to perform a number of actions, e.g., to reduce the latency associated to a change in traffic activity and/or for uplink from the WTRU (e.g., for the WTRU transmitter bandwidth).

In examples, a WTRU may be configured to transmit a number of signals and/or messages, for example, when the WTRU receiver bandwidth is increased to $BW_{OP}$. There may be a correlation between downlink and uplink activity. For example, an increase in downlink activity may be linked to an increase in uplink activity (e.g., to transmit TCP Acks). A WTRU may be configured to transmit one or more of sounding signals and/or power measurements, for example, to reduce uplink scheduling latency.

A WTRU may transmit (e.g., autonomously transmit) a sounding signal, for example, upon change of receiver bandwidth. In examples, a WTRU may be configured to transmit an SRS type of signal on the uplink at a specific time, for example, after receiving an indication to change the receiver bandwidth or after changing the receiver bandwidth. A WTRU may (e.g., alternatively) transmit an SRS, for example, when a change in receiver bandwidth may (e.g., does) result in an increase in WTRU receiver bandwidth. Properties of the SRS (e.g., bandwidth, timing, sequence ID, power, etc.) may be pre-configured.

The properties of the SRS transmitted may depend on the receiver bandwidth change. For example, the WTRU may be configured with more than one sets of SRS parameters, which may each be associated with a receiver bandwidth. The WTRU may be configured to transmit SRS with the properties or parameters associated to the receiver bandwidth it is changing to.

The WTRU may be configured with one or more sets of SRS parameters, each associated with an SRS index. The WTRU may be dynamically configured (e.g., by the network) to transmit an SRS by signaling the SRS index (e.g., in a control channel), e.g., the same as the control channel that indicates that the WTRU should change its receiver bandwidth.

The network may estimate the channel for uplink scheduling in a controllable fashion. The network may estimate the channel (e.g., by focusing the energy of the SRS in a shorter bandwidth). This may enable improved scheduling flexibility.

A WTRU may be configured to transmit (e.g., autonomously transmit) power measurements or information, for example, upon a change of receiver bandwidth. A WTRU may (e.g., may only) transmit information, for example, when a change in receiver bandwidth results in an increase in WTRU receiver bandwidth.

For example, a WTRU may be configured to report a reference signal received power (RSRP), power headroom report (PHR), and/or a virtual power headroom report.

An information message may be transmitted, for example, after reception of an uplink grant. In examples, a control information message may be transmitted first, regardless of the priority of the other data to be transmitted. In examples, the priority of messages with low-latency requirements may be maintained, and a control message may be delayed.

A WTRU may change its PRB indexing based on the receiver bandwidth configuration.

The WTRU may be configured to use relative PRB indexing (e.g., wherein the actual frequency index may depend on a WTRU configuration and may not depend on the carrier bandwidth). This approach may be used for example in the case where the WTRU maximum bandwidth is smaller than the carrier bandwidth. The network may allocate the WTRU to a subset of the carrier bandwidth. By using relative indexing, the signaling may be reduced (e.g., the number of bits to indicate a specific PRB or set of PRBs for a WTRU may be reduced).

The relative indexing configuration for the WTRU may include, for example, a starting frequency, a bandwidth, and/or an ending frequency. The frequency or bandwidth may be expressed in terms of subcarriers or group of subcarriers (e.g., PRBs or equivalent). The indexing may include (e.g., also optionally include) a specific step size (e.g., to enable non-continuous spectrum allocation).

In examples, the WTRU may be configured with more than one relative indexing configuration. The relative indexing configuration may be associated to an index and/or a WTRU receiver bandwidth. The WTRU may be configured to use a relative indexing configuration (e.g., based on the WTRU receiver bandwidth configuration). The WTRU may be configured to determine which relative indexing configuration to use (e.g., based on a signaled index from the network over a control channel or for example by association with the WTRU receiver bandwidth).

The WTRU may be configured with an absolute frequency reference point to determine the relation between the PRB index and the actual frequency. For example, the absolute reference point may be configured to be the DC carrier. In examples, the absolute reference point may be associated to a synchronization reference signal (e.g., a predefined subcarrier of the synchronization signal), which may be provided by the network. In examples, the WTRU may be configured to select the absolute reference based on the numerology (e.g., the WTRU may be configured to use the synchronization signal of the same numerology (in the configured carrier) as a reference point).

The subcarrier index may be based on the WTRU configured numerology. This may result in efficient use of the indexing bit field. The WTRU may be configured to use the smaller subcarrier spacing as a baseline for indexing. This may result in improved resource usage (e.g., when multiple numerologies are used).

A WTRU may adapt control channel reception parameters based on receiver bandwidth.

A WTRU may be configured and/or associated with a control resource set for each receiver bandwidth configured. The control resource set may be associated to a set of control channel or signal formats (e.g., DCI formats). The WTRU may determine which control resource set to monitor (e.g., based on the receiver bandwidth being used and/or active). The WTRU may determine control formats to use for blind decoding (e.g., based on the WTRU receiver bandwidth). The bit field size for indexing the resources (e.g., in frequency and/or time) may change (e.g., depending on the WTRU receiver bandwidth). The WTRU may be configured to perform blind decoding assuming DCI formats, which may depend on WTRU receiver bandwidth.

Bandwidth adaptation may be implemented in the context of multiple carrier operations. A WTRU may be configured with multiple carriers (e.g., also referred to as component carriers (CC)). A WTRU may use bandwidth adaptation for one or more of the CC. In carrier aggregation (CA), each CC may be activated or deactivated, except for the primary cell CC (e.g., the primary CC), which may be (e.g., always be)

activated. The CC associated to the secondary serving cell (e.g., the secondary CC) may be activated and deactivated.

A CC may be configured (e.g., configured independently), where a (e.g., each) CC may be configured with one or more receiver bandwidth configurations. Each configuration may be associated to one or more control resource sets.

A WTRU may deactivate CC when 0 PRB is configured for that CC. For example, the CC may be configured with a receiver bandwidth with 0 PRB; this option may be equivalent to deactivating the CC. When a WTRU is configured to change the receiver bandwidth for a CC to a 0 PRB receiver bandwidth configuration, the WTRU may deactivate this CC and, may perform (e.g., may optionally perform) one or more (e.g., all) the tasks associated to CC deactivation.

A secondary CC may be configured with a 0 PRB receiver bandwidth configuration. A primary CC may not be allowed for such a 0 PRB configuration. This may ensure that the WTRU maintains a constant connection to the network (e.g., at least on the primary CC).

A WTRU's actions related to a control resource set in another CC may be implemented. In an example control resource set configuration, a CC receiver bandwidth configuration (e.g., or a CC) may be configured with an associated set of control resource set, which may belong to another CC, or another receiver bandwidth (e.g., the associated control resource set frequency resources may be outside the receiver bandwidth for this CC).

A WTRU may be configured to deactivate a CC when the control resource set associated to the CC is located in another CC, which may be deactivated. A WTRU be configured to deactivate any CC for which no control resource set is currently being received. A WTRU may be configured to activate a CC for which the CC of its associated control resource set is being activated. This may enable efficient CC management with compact control resource sets.

WTRU conditions to change receiver bandwidth to narrowband with multiple CC may be implemented. A WTRU may be configured with multiple CCs. A WTRU may be configured to apply bandwidth adaptation, for example, on one (for example, only one) of the CCs. A WTRU may be configured to apply bandwidth adaptation on the CC associated to the primary serving cell (e.g., the primary CC). A WTRU may be configured to reduce (e.g., or change) the bandwidth of the primary serving cell CC on at least the condition that one or more (e.g., all) the other secondary serving cell CCs are deactivated. A WTRU may reduce processing with bandwidth reduction. A WTRU may be actively receiving data when the WTRU has multiple CCs activated. A WTRU may be configured to autonomously increase (e.g., or change) the receiver bandwidth for the primary CC upon activation of at least one additional CC. A WTRU may be operating with a reduced receiver bandwidth (e.g., to monitor the control resource set only on the primary serving cell) and upon reception of a CC activation message, the WTRU may not activate the secondary serving cell CC and may increase the receiver bandwidth (e.g., according to a pre-defined configuration) on the primary serving cell CC.

A single bandwidth state may be implemented for a WTRU. A WTRU may be configured with a single receiver bandwidth state, where the state may take two or more configured values (e.g., narrowband, wideband, and/or the like). The WTRU may have a single bandwidth state per CC.

A WTRU receiver bandwidth state may control CC activation status. For example, upon change of the WTRU receiver bandwidth state (e.g., via explicit signaling or via implicit rules), the WTRU may be configured to activate or deactivate a certain preconfigured set of CCs. For example, upon reduction of receiver bandwidth, the WTRU may deactivate one or more (e.g., all) activated secondary CCs. A WTRU may apply (e.g., further apply) the reduced receiver bandwidth configuration on the primary CC. A WTRU may be configured to store the activation state of the CCs (e.g., before the bandwidth reduction has taken place). A WTRU may re-activate the CCs when the WTRU increases its receiver bandwidth, for example when triggered to do so. A WTRU may be configured to not re-activate any secondary CCs when increasing the receiver bandwidth on the primary CC, and may rely on explicit CC activation/deactivation messages.

UL grant may be selected with one or more (e.g., multiple) configured BWPs

A WTRU may be configured with one or more LCHs and/or logical channel groups (LCGs). The WTRU may be configured (e.g., further configured) with one or more mapping rules for such LCHs and/or LCGs. The mapping rules may be based on the determination of whether or not a value received as an indication in a DCI corresponds to a value of the WTRU's configuration for such LCHs and/or LCGs. The indication may correspond to a transmission profile. The WTRU may be configured to determine whether or not it may multiplex data from such LCHs and/or LCGs based on the mapping rule. The WTRU may multiplex data from a LCH and/or a LCG when the indicated value corresponds to a value that is part of the LCH and/or LCG configuration. In examples, a transmission profile may include of one or more values for one or more transmission parameters and/or characteristics associated with a grant. The transmission profile may include one or more of the following: the numerology of the transmission, the duration of the transmission (e.g., TTI duration), and/or the like.

The WTRU may be configured with one or more bandwidth parts for a given carrier and/or cell. A BWP may be in an active state or in an inactive state. The WTRU may be configured with a semi-persistent grant (SPS grant) for the resources of the cell. Such grant may correspond to one or more transmission profile(s). The WTRU may receive a dynamic signaling(s) that schedules a transmission for resources of the cell. The dynamically scheduled transmission may coincide (e.g., at least partly coincide) in time with the timing of the SPS grant. The WTRU may be configured to determine whether to use the configured grant or the dynamically scheduled grant according to at least one of the following: the WTRU may use the dynamically scheduled grant if both grants correspond to an active BWP; the WTRU may use the dynamically scheduled grant if both grants correspond to the same BWP (e.g., active BWP); the WTRU may use the dynamically scheduled grant if it corresponds to a different BWP than the BWP of the configured grant; and/or the WTRU may use the configured grant if there is data available for transmission for a LCH and/or a LCG that corresponds to a transmission profile of the configured grant but not to at least one transmission profile associated with the dynamically scheduled grant.

For the case of the WTRU using the dynamically scheduled grant if it corresponds to a different BWP than the BWP of the configured grant, if the BWP of the dynamically scheduled grant is inactive, the WTRU may determine (e.g., implicitly determine) that the BWP may be activated. The WTRU may deactivate one or more other BWPs (e.g., in case at most one BWP may be active for the cell at any time).

The WTRU may determine whether a DCI received on a physical control channel enables a selection between a configured grant and a dynamic grant that may coincide in time for a given carrier as a function of the respective characteristics of a (e.g., each) grant (e.g., the corresponding transmission profile(s) of the transmissions) and the data available for transmission (e.g., the applicable transmission profile(s) for the data). For example, the WTRU may determine that the configured grant is being adapted (e.g., the dynamic scheduling may override the configured scheduling information) by the dynamic scheduling if the corresponding transmission profile(s) is different for both grants but where the dynamic grant includes those of the configured grant. If the corresponding transmission profile(s) is same for both grants, the WTRU may determine that it may ignore the dynamically scheduled grant if (e.g., and only if) there is data available for transmission corresponding to the transmission profile of the configured grant. Data may be available that corresponds to a transmission profile of the configured grant that may not be accommodated by the dynamically scheduled grant according to the transmission profile of the dynamically received grant. The WTRU may multiplex data for one or more (e.g., multiple) LCHs applicable to the selected grant, for example in order of priority and/or prioritized bit rate (e.g., according to a logical channel prioritization function).

Each of the computing systems described herein may have one or more computer processors having memory that are configured with executable instructions or hardware for accomplishing the functions described herein including determining the parameters described herein and sending and receiving messages between entities (e.g., WTRU and network) to accomplish the described functions. The processes described above may be implemented in a computer program, software, and/or firmware incorporated in a computer-readable medium for execution by a computer and/or processor.

Examples presented in the context of a WTRU receiver may be applicable to a WTRU transmitter. Examples presented with respect to New Radio may be applicable to other radio access technologies (e.g., LTE, UMTS, WiFi).

Systems, methods, and instrumentalities have been disclosed for receiver bandwidth adaptation for radio access technologies (RATs), such as New Radio (NR) or 5G flexible RAT. WTRU control channel (e.g., receiver) bandwidth may adapt or change, for example, based on WTRU activity (e.g., based on activity timer, etc.). A WTRU may send an ACK/CQI, for example, to acknowledge a receiver bandwidth adaptation (e.g., a change in receiver bandwidth). A WTRU may autonomously change its receiver bandwidth, for example, based on activity such as new data in a buffer, BSR transmission, PRACH transmission, change of RRC state, etc. An SRS property may depend on, for example, WTRU RX bandwidth (e.g., RX-TX bandwidth linked). Relative indexing may be based on, for example, WTRU RX bandwidth and an absolute reference point. A WTRU control resource set and parameters may depend on, for example, WTRU RX bandwidth. Bandwidth adaptation may be performed for a WTRU with multiple carriers (e.g., component carriers) and/or multiple control resource sets. A control resource set may be scaled (e.g., based on WRTU receiver bandwidth). A WTRU may indicate a network of retuning time requirements (e.g., based on configured bandwidth parts). A WTRU may reject a configuration (e.g., when a DL reception gap may be too short). Receiver bandwidth adaptation may be implemented, for example, in a WTRU and/or network layers (e.g., L1 and/or L2). Receiver bandwidth adaptation may improve control channel operation and may reduce power consumption.

The processes and instrumentalities described herein may apply in any combination, may apply to other wireless technologies, and for other services.

A WTRU may refer to an identity of the physical device, or to the user's identity such as subscription related identities, e.g., MSISDN, SIP URI, etc. WTRU may refer to application-based identities, e.g., user names that may be used per application.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed is:

1. A method implemented by a wireless transmit/receive unit (WTRU), the method comprising:
receiving configuration information associated with a secondary carrier, wherein the secondary carrier is associated with a secondary cell and the configuration information includes information regarding a low power bandwidth associated with the secondary cell;
receiving first downlink control information (DCI);
determining, based on the first DCI and the received configuration information, that the low power bandwidth associated with the secondary cell is to be activated; and
responsive to determining that the low power bandwidth associated with the secondary cell is to be activated, activating the low power bandwidth for the secondary cell, wherein no control resource set is monitored on the secondary cell when the low power bandwidth of the secondary cell is activated.

2. The method of claim 1, wherein the configuration information includes an identifier of the low power bandwidth, and the low power bandwidth is non-zero.

3. The method of claim 1, further comprising:
receiving second DCI;
determining, based on the second DCI and the received configuration information, that the low power bandwidth associated with the secondary cell is to be deactivated; and
responsive to determining that the low power bandwidth associated with the secondary cell is to be deactivated, deactivating the low power bandwidth for the secondary cell, and activating another bandwidth for the secondary cell.

4. The method of claim 3, wherein the configuration information further includes an identifier of the other bandwidth that is activated responsive to determining that the low power bandwidth associated with the secondary cell is to be deactivated.

5. The method of claim 3, wherein less power is consumed by the WTRU with the low power bandwidth activated than with the other bandwidth activated.

6. The method of claim 1, wherein activating the low power bandwidth for the secondary cell comprises performing a measurement associated with the low power bandwidth and transmitting a result of the measurement to a network entity.

7. The method of claim 6, wherein the measurement comprises a channel state information (CSI) measurement.

8. The method of claim 1, wherein the first DCI includes one or more bits indicating that the low power bandwidth associated with the secondary cell is to be activated.

9. The method of claim 1, wherein the configuration information is received via radio resource control (RRC) signaling and the first DCI is received via a physical downlink control channel (PDCCH) transmission.

10. A wireless transmit/receive unit (WTRU), comprising:
a processor configured to:
receive configuration information associated with a secondary carrier, wherein the secondary carrier is associated with a secondary cell and the configuration information includes information regarding a low power bandwidth associated with the secondary cell;
receive first downlink control information (DCI);
determine, based on the first DCI and the received configuration information, that the low power bandwidth associated with the secondary cell is to be activated; and
based on the determination that the low power bandwidth associated with the secondary cell is to be activated, activate the low power bandwidth for the secondary cell, wherein no control resource set is monitored on the secondary cell when the low power bandwidth of the secondary cell is activated.

11. The WTRU of claim 10, wherein the configuration information includes an identifier of the low power bandwidth, and the low power bandwidth is non-zero.

12. The WTRU of claim 10, wherein the processor is further configured to:
receive second DCI;
determine, based on the second DCI and the received configuration information, that the low power bandwidth associated with the secondary cell is to be deactivated; and
based on the determination that the low power bandwidth associated with the secondary cell is to be deactivated, deactivate the low power bandwidth for the secondary cell; and
activate another bandwidth for the secondary cell.

13. The WTRU of claim 12, wherein the configuration information further includes an identifier of the other bandwidth that is activated based on the determination that the low power bandwidth associated with the secondary cell is to be deactivated.

14. The WTRU of claim 12, wherein less power is consumed by the WTRU with the low power bandwidth activated than with the other bandwidth activated.

15. The WTRU of claim 10, wherein the processor being configured to activate the low power bandwidth for the secondary cell comprises the processor being configured to perform a measurement associated with the low power bandwidth and transmit a result of the measurement to a network entity.

16. The WTRU of claim 15, wherein the measurement comprises a channel state information (CSI) measurement.

17. The WTRU of claim 10, wherein the first DCI includes one or more bits indicating that the low power bandwidth associated with the secondary cell is to be activated.

18. The WTRU of claim 10, wherein the configuration information is received via radio resource control (RRC) signaling and the first DCI is received via a physical downlink control channel (PDCCH) transmission.

* * * * *